US011418698B2

(12) United States Patent
Takahara et al.

(10) Patent No.: US 11,418,698 B2
(45) Date of Patent: Aug. 16, 2022

(54) FOCUS ADJUSTMENT DEVICE AND IMAGING APPARATUS

(71) Applicant: NIKON CORPORATION, Tokyo (JP)

(72) Inventors: Hiroaki Takahara, Matsudo (JP); Hiroyuki Tomita, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 17/023,788

(22) Filed: Sep. 17, 2020

(65) Prior Publication Data

US 2021/0006727 A1 Jan. 7, 2021

Related U.S. Application Data

(63) Continuation of application No. 16/369,373, filed on Mar. 29, 2019, now Pat. No. 10,855,905, which is a (Continued)

(30) Foreign Application Priority Data

Jun. 29, 2011 (JP) ................................. 2011-144723
Jun. 29, 2011 (JP) ................................. 2011-144750
Jun. 30, 2011 (JP) ................................. 2011-145268

(51) Int. Cl.
*H04N 5/232* (2006.01)
*G02B 7/36* (2021.01)
(Continued)

(52) U.S. Cl.
CPC ....... *H04N 5/232123* (2018.08); *G02B 7/285* (2013.01); *G02B 7/346* (2013.01);
(Continued)

(58) Field of Classification Search
None
See application file for complete search history.

(56) References Cited

U.S. PATENT DOCUMENTS 5,873,006 A * 2/1999 Iwane ...................... G02B 7/28
396/95
5,896,174 A * 4/1999 Nakata ............. H04N 5/232123
348/348
(Continued)

FOREIGN PATENT DOCUMENTS

CN 1402077 A 3/2003
CN 1506743 A 6/2004
(Continued)

OTHER PUBLICATIONS

Sep. 1, 2020 Office Action issued in Chinese Patent Application No. 201811268009.5.
(Continued)

*Primary Examiner* — James M Hannett
(74) *Attorney, Agent, or Firm* — Oliff PLC

(57) ABSTRACT

A focus adjustment device comprising: a first detector which detects a focused state by a contrast detection system; second detectors which detect a focused state by a phase difference detection system; and a control unit which controls the first detector and second detectors so as to detect the focused state by the second detectors when detecting the focused state by the first detector.

9 Claims, 18 Drawing Sheets

Related U.S. Application Data continuation of application No. 13/536,000, filed on Jun. 28, 2012, now Pat. No. 10,250,793.

(60) Provisional application No. 61/586,469, filed on Jan. 13, 2012, provisional application No. 61/586,444, filed on Jan. 13, 2012, provisional application No. 61/586,453, filed on Jan. 13, 2012.

(51) Int. Cl.
*G02B 7/34* (2021.01)
*G02B 7/28* (2021.01)
*H04N 9/04* (2006.01)
*G03B 13/36* (2021.01)

(52) U.S. Cl.
CPC ......... *G02B 7/36* (2013.01); *H04N 5/232122* (2018.08); *H04N 9/04557* (2018.08); *H04N 9/04561* (2018.08); *G03B 13/36* (2013.01); *H04N 5/23209* (2013.01)

(56) References Cited

U.S. PATENT DOCUMENTS

| | | | |
|---|---|---|---|
| 8,319,870 | B2 | 11/2012 | Shintani et al. |
| 2003/0048372 | A1 | 3/2003 | Yasuda |
| 2003/0151688 | A1* | 8/2003 | Tojo ................. H04N 1/00453 348/345 |
| 2004/0057712 | A1 | 3/2004 | Sato et al. |
| 2004/0170419 | A1 | 9/2004 | Taka |
| 2005/0058443 | A1 | 3/2005 | Taka |
| 2006/0029380 | A1 | 2/2006 | Taka |
| 2007/0206940 | A1 | 9/2007 | Kusaka |
| 2007/0230937 | A1 | 10/2007 | Ide et al. |
| 2008/0007644 | A1 | 1/2008 | Matsumoto |
| 2008/0025715 | A1* | 1/2008 | Ishii ................. H04N 5/232122 396/105 |
| 2009/0066830 | A1 | 3/2009 | Fujii et al. |
| 2009/0067828 | A1* | 3/2009 | Ono ................. H04N 5/232123 396/128 |
| 2010/0150538 | A1 | 6/2010 | Ono et al. |
| 2011/0001858 | A1 | 1/2011 | Shintani et al. |
| 2012/0133813 | A1 | 5/2012 | Nagano |
| 2012/0154616 | A1* | 6/2012 | Sato ................. H04N 5/232127 348/220.1 |
| 2013/0044246 | A1 | 2/2013 | Shintani et al. |
| 2013/0050550 | A1 | 2/2013 | Shintani et al. |

FOREIGN PATENT DOCUMENTS

| | | |
|---|---|---|
| CN | 101038363 A | 9/2007 |
| CN | 101101429 A | 1/2008 |
| CN | 101387733 B | 3/2009 |
| CN | 100474025 C | 4/2009 |
| CN | 101952759 A | 1/2011 |
| JP | 2002-365528 A | 12/2002 |
| JP | 2004-109690 A | 4/2004 |
| JP | 2005-084426 A | 3/2005 |
| JP | 2005-092085 A | 4/2005 |
| JP | 2005-121819 A | 5/2005 |
| JP | 2006-53545 A | 2/2006 |
| JP | 2006-084995 A | 3/2006 |
| JP | 2006-301150 A | 11/2006 |
| JP | 2008-15274 A | 1/2008 |
| JP | 2008-134390 A | 6/2008 |
| JP | 2008-249966 A | 10/2008 |
| JP | 2009-175528 A | 8/2009 |
| JP | 2009-224913 A | 10/2009 |
| JP | 2009-271523 A | 11/2009 |
| JP | 2009-288778 A | 12/2009 |
| JP | 2010-074795 A | 4/2010 |
| JP | 2010-113272 A | 5/2010 |
| JP | 2010-217618 A | 9/2010 |
| JP | 2010-282085 A | 12/2010 |
| JP | 2011-085871 A | 4/2011 |
| WO | 2009/104390 A1 | 8/2009 |

OTHER PUBLICATIONS

Apr. 18, 2016 Office Action Issued in U.S. Appl. No. 13/536,000.
Mar. 3, 2016 Office Action issued in Chinese Application No. 201210225713.9.
Oct. 17, 2016 Office Action issued in Chinese Patent Application No. 201210225713.9.
Feb. 24, 2017 Office Action issued in U.S. Appl. No. 13/536,000.
Apr. 12, 2017 Office Action issued in Chinese Patent Application No. 201210225713.9.
Oct. 11, 2017 Office Action Issued in U.S. Appl. No. 13/536,000.
Dec. 8, 2017 Office Action issued in Chinese Patent Application No. 201210225713.9.
Mar. 27, 2018 Office Action Issued in U.S. Appl. No. 13/536,000.
Oct. 1, 2013 Office Action issued in Japanese Patent Application No. JP 2011-144723.
Oct. 22, 2013 Office Action issued in Japanese Patent Application No. JP 2011-144750.
Translation of Office Action issued in Japanese Patent Application No. 2011-144750 dated Feb. 4, 2014.
English translation of Apr. 23, 2013 Office Action issued in Japanese Patent Application No. 2011-145268.
English translation of Apr. 23, 2013 Office Action issued in Japanese Patent Application No. 2011-144723.
Aug. 1, 2014 Office Action issued in U.S. Appl. No. 13/536,000.
Mar. 19, 2015 Office Action issued in U.S. Appl. No. 13/536,000.
Aug. 26, 2015 Office Action issued in U.S. Appl. No. 13/536,000.
Nov. 16, 2018 Notice of Allowance issued in U.S. Appl. No. 13/536,000.
Apr. 3, 2019 Office Action issued in Indian Patent Application No. 2561/CHE/2012.
Jun. 17, 2020 Notice of Allowance issued in U.S. Appl. No. 16/369,373.
Jun. 17, 2020 Office Action issued in Chinese Patent Application No. 201811268609.1.
Dec. 16, 2019 Office Action issued in U.S. Appl. No. 16/369,373.

\* cited by examiner

FOCUS ADJUSTMENT DEVICE AND IMAGING APPARATUS

CROSS REFERENCE TO RELATED APPLICATION

This application is a continuation application of U.S. application Ser. No. 16/369,373, filed Mar. 29, 2019, which in turn is a continuation application of U.S. application Ser. No. 13/536,000, filed Jun. 28, 2012, the contents of which are incorporated herein by reference.

BACKGROUND

1. Field of the Invention

The present invention relates to a focus adjustment device and an imaging apparatus.

2. Description of the Related Art

In the past, there has been known the art where, when adjusting the focus of an optical system, to improve the precision of the focus adjustment, first, a phase difference detection system is used to detect the focused state of the optical system, the results of detect ion by the phase difference detection system are used as the basis to drive the lens for focus adjustment to near the focused position, then, near the focused position, a contrast detection system is used to detect the focused state of the optical system, and the results of detection by the contrast detection system are used as the basis to drive the focus adjustment optical system to the focused position (for example, see Japanese Patent Publication No. 2004-109690 A1).

SUMMARY

However, the above PLT 1 is predicated on scenes where both the phase difference detection system and the contrast detection system can be used to detect the focus of the optical system. For this reason, in the scenes where either system of the phase difference detection system or contrast detection system could not be used to detect the focus, sometimes the focus could not be adjusted well. Further, in the above PLT 1, first, the phase difference detection system is used to detect the focus, then the contrast detection system is used to detect the focus, so there was also the problem of the focus adjustment ending up taking time.

The technical problem of the present invention is to provide a focus adjustment device which can suitably perform focus adjustment.

The present invention uses the following means to solve the above problem. Note that, below, the explanation is given while attaching reference notations corresponding to the figures which show embodiments of the present invention, but the reference notations are only for facilitating understanding of the invention and do not limit the invention.

The focus adjustment device according to the first aspect of the present invention is comprising: a first detector (221) which uses a contrast detection system to detect a focused state; second detectors (222a, 222b) which use a phase difference detection system to detect a focused state; and a control unit (21) which controls the first detector and the second detectors so as detect the focused state by the second detectors when detecting the focused state by the first detector.

In the focus adjustment device to the present invention, further comprising an imaging unit (22) which captures an image by an optical system which has a focus adjustment optical system (32) and which outputs an image signal which corresponds to the captured image and a focus adjustment unit (36) which drives the focus adjustment optical system in an optical axis direction of the focus adjustment optical system to adjust a focused state of the optical system, the first detector (221) uses an image signal which is output by the imaging unit as the basis to calculate an evaluation value which relates to contrast of the image formed by the optical system so as to detect the focused state of the optical system, the second detectors (222a, 222b) are provided at a light receiving surface of the imaging unit and use the phase difference to detect the focused state of the optical system while the imaging unit is capturing an image, and the control unit (21) sets a state enabling detection of the focused state by the first detector and detection of the focused state by the second detectors.

In the focus adjustment device to the present invention, the control unit (21) sets a state enabling detection of the focused state by the first detector (221) and detection of the focused state by the second detectors when the second detectors (222a, 222b) cannot detect the focused state of the optical system.

In the focus adjustment device to the present invention, the control unit (21) makes the focus adjustment unit (36) drive the focus adjustment optical system (32) for scanning so as to set a state enabling detection of the focused state by the first detector (221) and detection of the focused state by the second detectors (222a, 222b).

In the focus adjustment device to the present invention, the control unit (21) uses the results of the detection of the focused state of the optical system (31, 32, 33) performed first among the first detector (221) and the second detectors (222a, 222b) so as to drive the focus adjustment optical system (32) to the focused position.

In the focus adjustment device to the present invention, the control unit (21) makes the first detector (221) detect the focused state of the optical system when the second detectors (222a, 222b) cannot detect the focused state of the optical system (31, 32, 33).

In the focus adjustment device to the present invention, the control unit (21) uses the results of detection by the second detectors as the basis to drive the focus adjustment optical system (32) to the focused position when the second detectors (222a, 222b) can detect the focused state of the optical system (31, 32, 33).

In the focus adjustment device to the present invention, the control unit (21) makes the focus adjustment unit (36) drive the focus adjustment optical system (32) while performing detection of the focused state by the first detector (221) and detection of the focused state by the second detectors when the second detectors (222a, 222b) cannot detect the focused state of the optical system.

The focus adjustment device according to the second aspect of the present invention comprising: a first detector (221) which uses a contrast detection system to detect a focused state; second detectors (222a, 222b) which use a phase difference detection system to detect a focused state; and a control unit (21) which performs control to prohibit drive of the focus adjustment optical system to the position which was detected by the second detectors when driving the focus adjustment optical system (32) to the position which was detected by the first detector.

In the focus adjustment device to the present invention, further comprising an imaging unit (22) which captures an image by an optical system which has a focus adjustment optical system (32) and which outputs an image signal which corresponds to the captured image and a focus adjustment unit (36) which drives the focus adjustment optical system (32) in an optical axis direction of the focus adjustment optical system to adjust a focused state of the optical system, the first detector (221) uses an image signal which is output by the imaging unit as the basis to calculate an evaluation value which relates to contrast of the image formed by the optical system so as to detect the focused state of the optical system, the second detectors (222a, 222b) use the phase difference to detect the focused state of the optical system while the imaging unit is capturing an image, and the control unit (21) prohibits drive of the focus adjustment optical system based on the results of detection by the second detectors until the drive operation of the focus adjustment optical system based on the results of detection by the first detector is completed.

In the focus adjustment device to the present invention, the control unit (21) permits drive of the focus adjustment optical system based on the results of detection by the second detectors (222a, 222b) after a predetermined time elapses after the drive operation of the focus adjustment optical system (32) based on the results of detection by the first detector (221) is completed.

In the focus adjustment device to the present invention, further comprising a notification unit (25, 26) which notifies a user of focus, the control unit (21) permits drive of the focus adjustment optical system based on the results of detection of the second detectors (222a, 222b) after the notification unit notifies after the drive operation of the focus adjustment optical system (32) based on the results of detection of the first detector (221) is completed.

In the focus adjustment device to the present invention, the control unit (21) prohibits detection of the focused state of the optical system (31, 32, 33) by the second detectors (222a, 222b) until the drive operation of the focus adjustment optical system (32) based on the results of detection of the first detector (221) is completed.

In the focus adjustment device to the present invention, the control unit (21) permits detection of the focused state of the optical system (31, 32, 33) by the second detectors (222a, 222b) even when the first detector (221) detects the focused position.

In the focus adjustment device to the present invention, the second detectors (222a, 222b) are provided at a light receiving surface of the imaging unit (22).

In the focus adjustment device to the present invention, the control unit (21) makes the first detector (221) detect the focused state of the optical system (31, 32, 33) when the second detectors (222a, 222b) cannot detect the focused position.

The focus adjustment device according to a third aspect of the present invention comprising: detectors (221, 222a, 222b) which can detect a focused state by a phase difference detection system while detecting focus evaluation values by a contrast detection system during driving a focus adjustment optical system (32); a control unit (21) which, when detecting a peak of the focus evaluation values by driving the focus adjustment optical system by a first speed which is slower than a predetermined speed, performs control to drive the focus adjustment optical system to a position which corresponds to the peak and which, when detecting a peak of the focus evaluation values by driving the focus adjustment optical system by a second speed which is faster than a predetermined speed, performs control to not drive the focus adjustment optical system to a position which corresponds to the peak, but drive the focus adjustment optical system by a speed which is slower than the predetermined speed to as detect the peak of the focus evaluation values.

In the focus adjustment device to the present invention, further comprising an imaging unit (22) which captures an image by an optical system (31, 32, 33) which has a focus adjustment optical system (32) and which outputs an image signal which corresponds to the captured image and a focus adjustment unit (36) which drives the focus adjustment optical system (32) in an optical axis direction of the focus adjustment optical system to make an image plane of the optical system move by a predetermined speed of movement so as to adjust a focused state of the optical system, the detector has a first detector (221) which uses the image signal which was output from the imaging unit as the basis to calculate an evaluation value which relates to contrast of an image formed by the optical system so as to detect the focused state of the optical system and second detectors (222a, 222b) which use the phase difference to detect the focused state of the optical system while capturing an image by the imaging unit, and the control unit (21) makes the focus adjustment unit drive the focus adjustment optical system so as to set a state enabling detection of the focused state by the second detectors and detection of the focused state by the first detectors, changes the speed of movement of the image plane to a predetermined speed or less when the speed of movement of the image plane when the peak of the evaluation values is detected is faster than the predetermined speed, and drives the focus adjustment optical system to a position where the evaluation value peaks when the speed of movement of the image plane is the predetermined speed or less.

In the focus adjustment device to the present invention, the control unit (21) drives the focus adjustment optical system (32) to the peak of the evaluation values when the first detector (221) detects a peak of the evaluation value after changing the speed of movement of the image plane to a speed of the predetermined speed or less.

In the focus adjustment device to the present invention, the control unit (21) drives the focus adjustment optical system (32) to the focused position when the second detectors (222a, 222b) detected the focused position after changing the speed of movement of the image plane to a speed of a predetermined speed or less.

In the focus adjustment device to the present invention, the second detectors (222a, 222b) are provided at a light receiving surface of the imaging unit (22).

In the focus adjustment device to the present invention, further comprising a storage unit (38) which stores in advance a fastest speed among the speeds of movement of the image plane by which the first detector (221) can detect the focused position as a focus detectable speed, and the control unit (21) uses the focus detectable speed as the predetermined speed.

In the focus adjustment device to the present invention, the control unit (21) makes the first detector (221) detect the focused state of the optical system when the second detectors (222a, 222b) cannot detect the focused position.

The imaging apparatus according to the present invention is provided with the above focus adjustment device.

According to the present invention, it is possible to suitably adjust the focus.

BRIEF DESCRIPTION OF THE DRAWINGS

FIG. 6(A) is a front view which shows enlarged one of the focus detection pixels 222a, while

FIG. 8(A) is a cross-sectional view which shows one of the focus detection pixels 222a enlarged, while

DETAILED DESCRIPTION OF EMBODIMENTS

Figure 1:
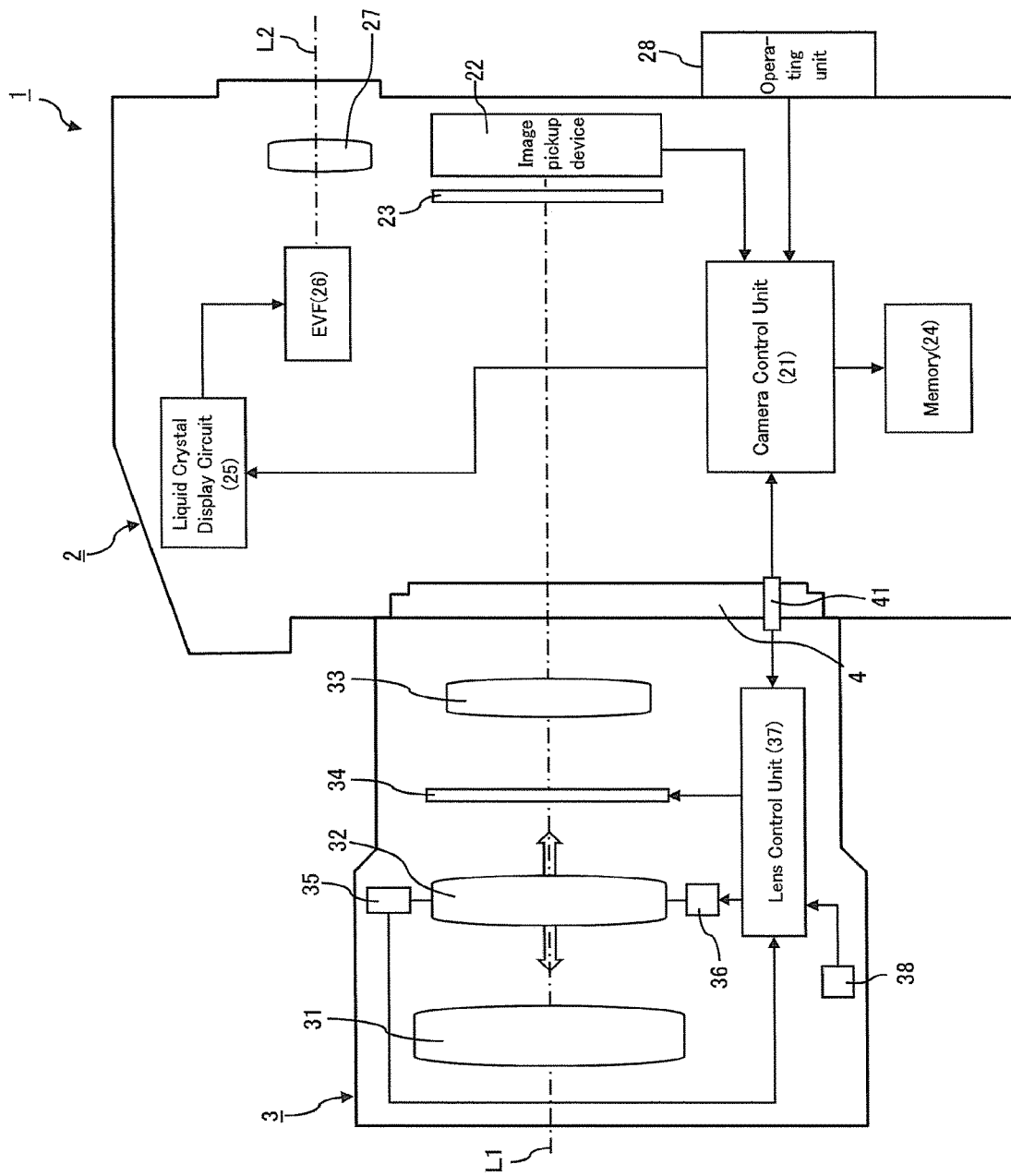
FIG. 1 is a block diagram which shows a digital camera 1 according to the present embodiment.

Below, embodiments of the present invention will be explained with reference to the drawings First Embodiment FIG. 1 is a view of the principal configuration which shows a digital camera 1 according to an embodiment of the present invention. The digital camera 1 of the present embodiment (below, simply referred to as the "camera 1") is comprised of a camera body 2 and a lens barrel 3. These camera body 2 and lens barrel 3 are connected by a mount 4 in a detachable manner.

The lens barrel 3 is an interchangeable lens which can be detachably attached to the camera body 2. As shown in FIG. 1, the lens barrel 3 has built into it an imaging optical system which includes lenses 31, 32, and 33 and an aperture 34.

The lens 32 is a focus lens. By moving it in the optical axis L1 direction, the focal distance of the imaging optical system can be adjusted. The focus lens 32 is provided in a manner movable along the optical axis L1 of the lens barrel 3. An encoder 35 is used to detect its position while a focus lens drive motor 36 is used to adjust its position.

The specific constitution of the movement mechanism along the optical axis L1 of this focus lens 32 is not particularly limited. If giving one example, a rotating barrel is inserted in a rotatable manner inside a fixed barrel which is fixed to the lens barrel 3. The inner circumferential surface of this rotating barrel is formed with a helicoid groove (spiral groove). The end of the lens frame which fixes the focus lens 32 is engaged with the helicoid groove. Further, the focus lens drive motor 36 is used to make the rotating barrel rotate so that the focus lens 32 which is fixed to the lens frame moves straight along the optical axis L1.

As explained above, by making the rotating barrel rotate with respect to the lens barrel 3, the focus lens 32 which is fixed to the lens frame moves straight in the optical axis L1 direction, but the drive source constituted by the focus lens drive motor 36 is provided at the lens barrel 3. The focus lens drive motor 36 and the rotating barrel are, for example, coupled by a speed changer which is comprised of a plurality of gears. If driving the drive shaft of the focus lens drive motor 36 to either direction, this force is transmitted to the rotating tube by a predetermined gear ratio. Further, by the rotating tube rotating in either direction, the focus lens 32 which was fastened to the lens frame moves straight in either direction of the optical axis L1. Note that, if the drive shaft of the focus lens drive motor 36 is driven to rotate in the opposite direction, the plurality of gears which form the speed changer also rotate in the opposite direction, while the focus lens 32 moves straight in the opposite direction of the optical axis L1.

The position of the focus lens 32 is detected by the encoder 35. As already explained, the position in the optical axis L1 direction of the focus lens 32 is correlated with the rotational angle of the rotating tube, so, for example, can be found if detecting the relative rotational angle of the rotating barrel with respect to the lens barrel 3.

As the encoder 35 of the present embodiment, it is possible to use one which detects rotation of a rotary disk which is coupled with the rotational drive of a rotating barrel by a photo interrupter or other photo sensor so as to output a pulse signal corresponding to the rotational speed, one which brings an encoder pattern on the surface of a flexible printed circuit board which is provided at one of a fixed barrel and rotating barrel into contact with a brush contact which is provided at the other and detects the change in the contact position corresponding to the amount of movement of the rotating barrel (either in the rotational direction or optical axis direction) by a detection circuit, etc.

The focus lens 32 can be moved by rotation of the rotating tube from the end at the camera body side (also called the "near end") to the end at the object side (also called the "infinite end") in the optical axis L1 direction. Incidentally, the information on the current position of the focus lens 32 which is detected by the encoder 35 is sent through the lens control unit 37 to the later explained camera control unit 21. The focus lens drive motor 36 is driven by the drive position of the focus lens 32 which was calculated based on this information being sent from the camera control unit 21 through the lens control unit 37.

Further, in the present embodiment, the lens control unit 37, under the instruction of the camera control unit 21, drives the focus lens 32 by a predetermined lens drive speed by sending a drive pulse signal corresponding to the lens drive speed to the focus lens drive motor 36. Further, the lens control unit 37 stores the later explained focus detectable maximum speed $V_{max}$ of the focus lens 32 in a memory 38 which the lens control unit 37 is provided with.

The aperture 34 is configured to restrict the amount of the light beams which pass through the above imaging optical system to reach the image pickup device 22 and to be able to be adjusted the aperture size centered on the optical axis L1 so as to adjust the amount of blurring. The size of the aperture 34 is adjusted, for example, by a suitable size which was calculated by the automatic exposure mode being sent from the camera control unit 21 to the lens control unit 37. Further, the size which is set by manual operation of the operating unit 28 which is provided at the camera body 2 is input from the camera control unit 21 to the lens control unit 37. The size of the aperture 34 is detected by a not shown aperture size sensor. The current size is recognized by the lens control unit 37.

On the other hand, at the camera body 2, an image pickup device 22 which receives light beams L1 from the above imaging optical system is provided at the predetermined focal plane of the imaging optical system. At the front surface of the same, a shutter 23 is provided. The image pickup device 22 is comprised of a CCD or other device which converts the received optical signal to an electrical signal which it then sends to the camera control unit 21. The captured image information which is sent to the camera control unit 21 is sequentially sent to the liquid crystal drive circuit 25 and is displayed on an electronic viewfinder (EVF) 26 of a viewing optical system. When a release button (not shown) which is provided at the operating unit 28 is fully pressed, the captured image information is recorded in the recording medium, that is, a memory 24. The memory 24 can be any of a detachable card type memory or built-in type memory. Note that, in front of the surface of the image pickup device 22, an infrared cut filter for cutting the infrared light and an optical low pass filter for preventing aliasing noise of the image are arranged. Details of the structure of the image pickup device 22 will be explained later.

The camera body 2 is provided with the viewing optical system for viewing the image captured by the image pickup device 22. The viewing optical system of the present embodiment is provided with the electronic viewfinder (EVF) 26 which is comprised of a liquid crystal display element, a liquid crystal drive circuit 25 which drives the electronic viewfinder 26, and an ocular lens 27. The liquid crystal drive circuit 25 reads captured image information which was captured by the image pickup device 22 and was sent to the camera control unit 21 and uses this as the basis to drive the electronic viewfinder 26. Due to this, the user can view the currently captured image through the ocular lens 27. Note that, instead of the above viewing optical system using the optical axis L2 or in addition to it, it is also possible to provide a liquid crystal display at the back surface of the camera body 2 etc. and display the captured image on this liquid crystal display.

The camera body 2 is provided with a camera control unit 21. The camera control unit 21 is electrically connected with the lens control unit 37 by an electrical signal contact 41 which is provided on the mount 4. It receives lens information from this lens control unit 37 and sends the lens control unit 37 the amount of defocus, the aperture size, and other information. Further, the camera control unit 21, as explained above, reads the pixel output from the image pickup device 22, processes the read pixel output in accordance with need by predetermined information processing to generate image information, and outputs the produced image information to the liquid crystal drive circuit 25 of the electronic viewfinder 26 or memory 24. Further, the camera control unit 21 controls the camera 1 as a whole such as the correction of the image information from the image pickup device 22 and detection of the state of focus adjustment of the lens barrel 3, state of aperture adjustment, etc.

Further, the camera control unit 21, in addition to the above, uses the pixel data which was read from the image pickup device 22 as the basis for detection of the focused state of the imaging optical system by the phase detection system and detection of the focused state of the imaging optical system by the contrast detection system. Note that, the specific method of detection of the focused state will be explained later.

The operating unit 28 includes the shutter release button and input switches for the user to set various operating modes of the camera 1 and is designed to enable switching of the auto focus mode/manual focus mode and switching of the one-shot mode/continuous mode in the auto focus mode. Here, the "one-shot mode" is the mode of fixing the once adjusted position of the focus lens 32 and capturing an image at that focus lens position, while the "continuous mode" is the mode of adjusting the focus lens position in accordance with the object without fixing the position of the focus lens 32. The various modes which are set by the operating unit 28 are sent to the camera control unit 21. The camera control unit 21 controls the operation of the camera 1 as a whole in accordance with the mode set by the operating unit 28. Further, the shutter release button includes a first switch SW1 which is turned on by half pressing of the button and a second switch SW2 which is turned on by full pressing of the button.

Next, the image pickup device 22 according to the present embodiment will be explained.

Figure 2:
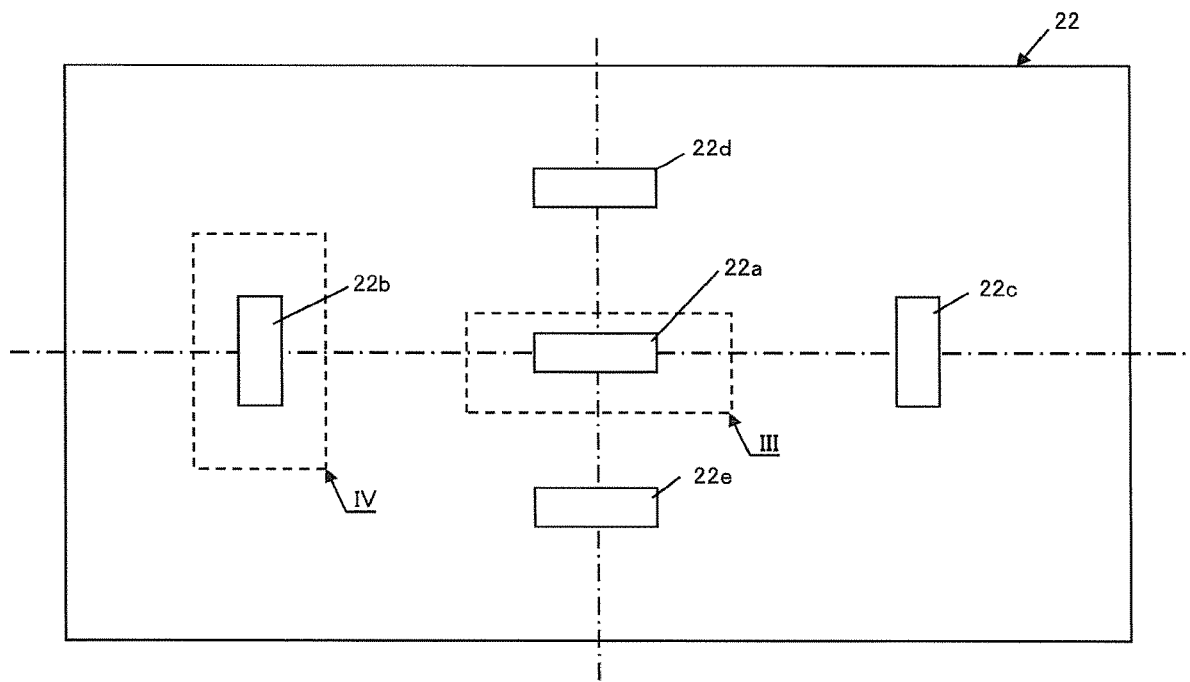
FIG. 2 is a front view which shows a focus detection position at an imaging plane of an image pickup device which is shown in FIG. 1.
Figure 3:
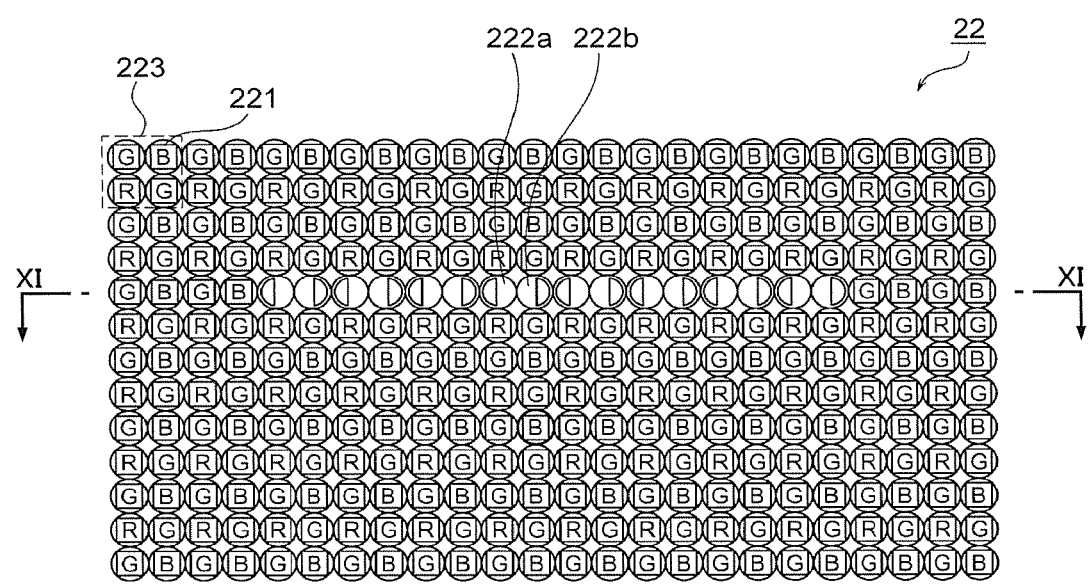
FIG. 3 is a front view which enlarges apart III of FIG. 2 to schematically show an arrangement of focus detection pixels 222a, 222b.
Figure 4:
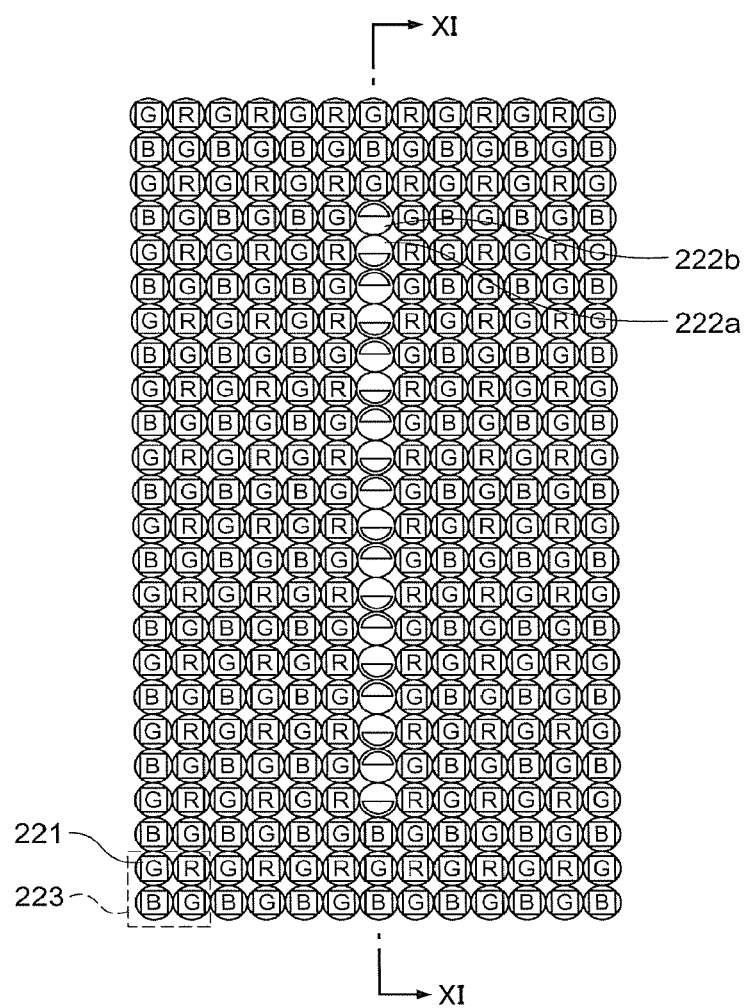
FIG. 4 is a front view which enlarges apart IV of FIG. 2 to schematically show an arrangement of focus detection pixels 222a, 222b.

FIG. 2 is a front view which shows an imaging plane of the image pickup device 22, FIG. 3 is a front view which enlarges part III of FIG. 2 to schematically show the arrangement of focus detection pixels 222a, 222b, and FIG. 4 is a front view which enlarges the part IV of FIG. 2 to schematically show the arrangement of focus detection pixels 222a, 222b.

The image pickup device 22 of the present embodiment, as shown in FIG. 3 and FIG. 4, is comprised of a plurality of imaging pixels 221 arranged on the plane of the imaging plane two-dimensionally, that is, green pixels G which have color filters which pass the wavelength region of the green color, red pixels R which have color filters which pass the wavelength region of the red color, and blue pixels B which have color filters which pass the wavelength region of the blue color arranged on a so-called "Bayer arrangement". That is, in each group 223 of four adjoining pixels (closely packed square lattice array), two green pixels are arranged on one diagonal, while one red pixel and one blue pixel are arranged on the other diagonal. By using such groups 223 of pixels arranged in a Bayer arrangement as units and arranging such groups 223 of pixels on the imaging plane of the image pickup device 22 repeatedly two-dimensionally, the image pickup device 22 is configured.

Note that, the array in the unit pixel group 223 may be for example a closely packed hexagonal lattice array instead of the illustrated closely packed square lattice. Further, the configuration and array of the color filters are not limited to this. It is also possible to employ an array of color correction filters (green: G, yellow: Ye, magenta: Mg, cyan: Cy).

Figure 5:
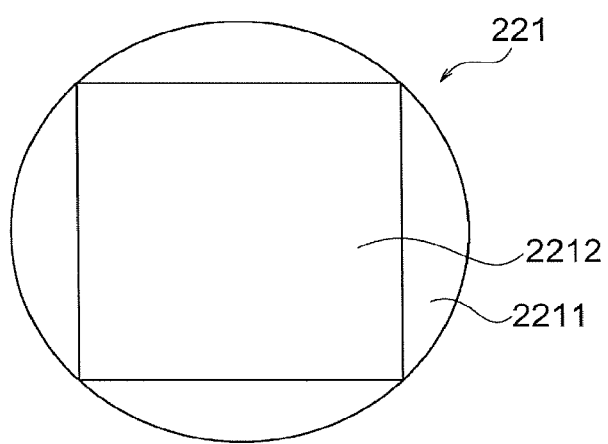
FIG. 5 is a front view which shows enlarged one of the imaging pixels 221.
Figure 7:
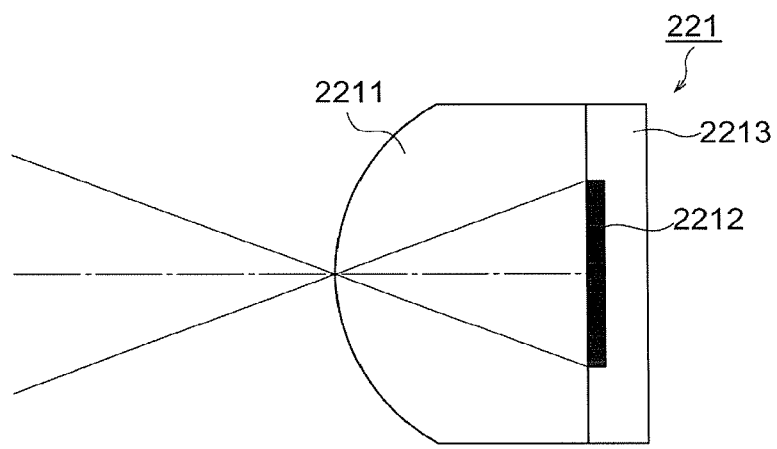
FIG. 7 is a cross-sectional view which shows one of the imaging pixels 221 enlarged.

FIG. 5 is a front view which shows one of the imaging pixels 221 enlarged, while FIG. 7 is a cross-sectional view of the same. One imaging pixel 221 is comprised of a microlens 2211, a photoelectric conversion unit 2212, and a not shown color filter. As shown in the cross-sectional view of FIG. 7, the photoelectric conversion unit 2212 is built into the surface of the semiconductor circuit board 213 of the image pickup device 22, while the microlens 2211 is formed on the surface of that. The photoelectric conversion unit 2212 is shaped to receive the imaging light beams which run from the microlens 2211 and pass through the exit pupil (for example, F1.0) of the imaging optical system 31 and thereby receives the imaging light beams.

Figure 9:
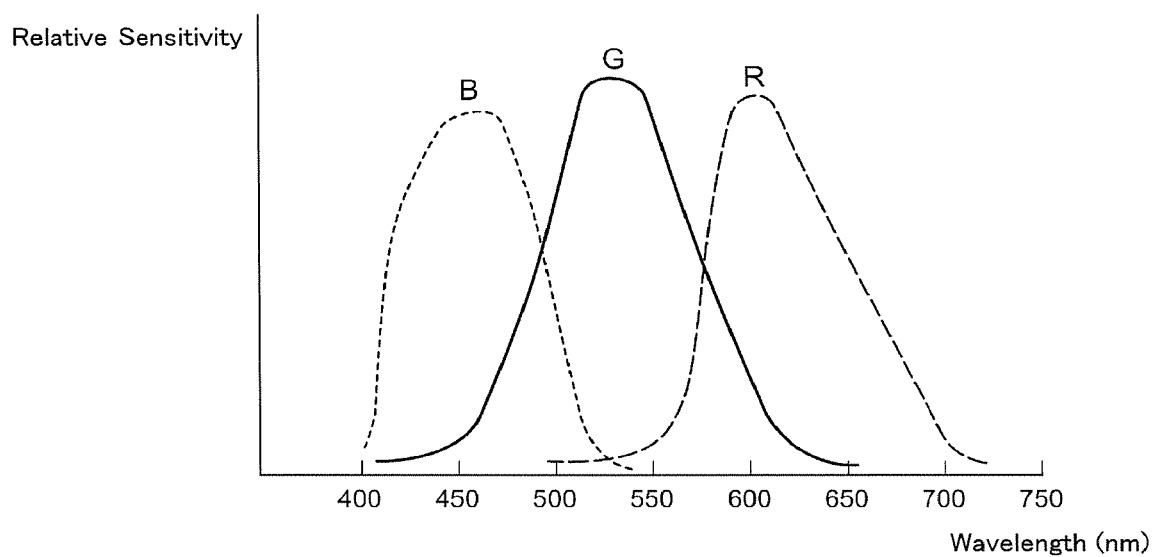
FIG. 9 is a spectral graph which shows relative sensitivities with respect to wavelength of three imaging pixels RGB.

Note that, the color filters of the present embodiment are provided between the microlenses 2211 and the photoelectric conversion units 2212. The spectral sensitivities of the color filters of the green pixels G, red pixels R, and blue pixels B are, for example, as shown in FIG. 9. FIG. 9 is a spectral graph which shows the relative sensitivities of the three imaging pixels RGB which are shown in FIG. 3 and FIG. 4 with respect to wavelength.

Returning to FIG. 2, at the center of the imaging plane of the image pickup device 22 and at the top and bottom and left and right symmetric positions from the center, that is, at five locations, focus detection pixel strings 22a, 22b, 22c, 22d, and 22e at which focus detection pixels 222a, 222b are arranged instead of imaging pixels 221 are provided. Further, as shown in FIG. 3 and FIG. 4, one focus detection pixel string comprises a plurality of focus detection pixels 222a and 222b arranged adjoining each other alternately in a horizontal string (22a, 22d, 22e) or a vertical string (22b, 22c). In the present embodiment, the focus detection pixels 222a and 222b are densely arranged without gap at the positions of the green pixels G and blue pixels B of the imaging pixels 221 arranged in a Bayer arrangement.

Note that, the positions of the focus detection pixel strings 22a to 22e which are shown in FIG. 2 are not limited to the illustrated positions. Strings may be arranged at any single location, two locations, three locations, etc. Further, they may be arranged at six or more locations as well. Further, in actual focus detection, the user can manually operate the operating unit 28 to select a desired focus detection pixel string as the focus detection position from among the plurality of arranged focus detection pixel strings 22a to 22e.

Figure 6A:
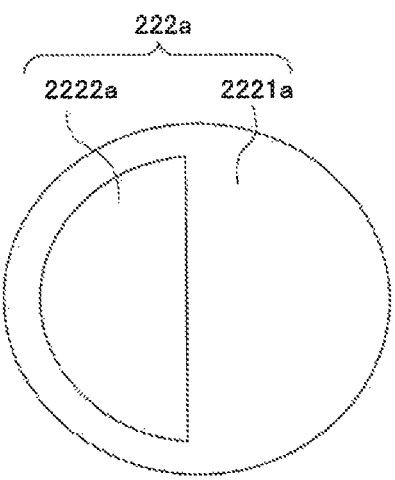
Figure 6B:
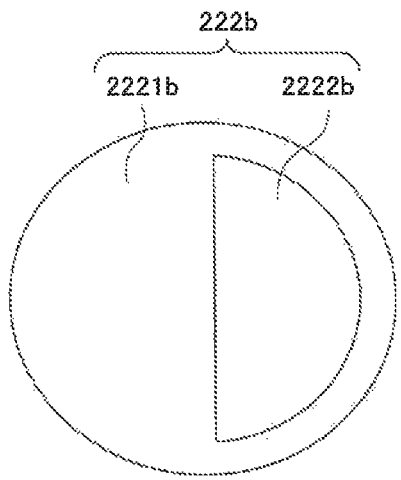
FIG. 6(B) is a front view which shows enlarged one of the focus detection pixels 222b.
Figure 8A:
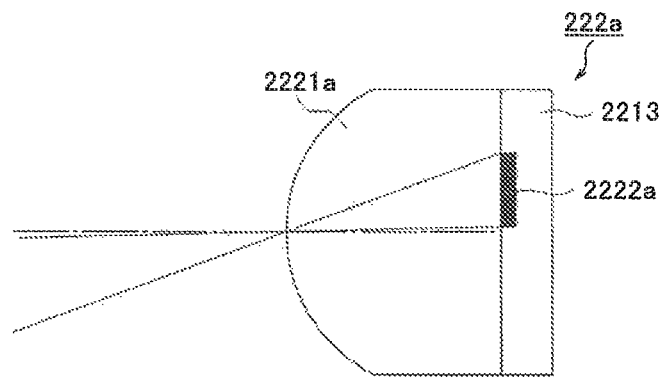
Figure 8B:
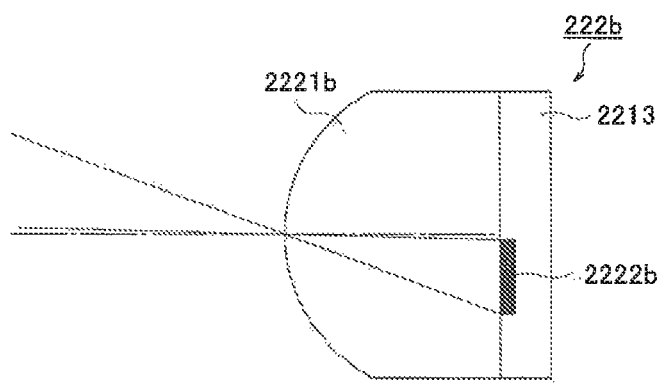
FIG. 8(B) is a cross-sectional view which shows one of the focus detection pixels 222b enlarged.

FIG. 6(A) is a front view which shows one of the focus detection pixels 222a enlarged, while FIG. 8(A) is a cross-sectional view of the focus detection pixel 222a. Further, FIG. 6(B) is a front view which shows one of the focus detection pixels 222b enlarged, while FIG. 8(B) is a cross-sectional view of the focus detection pixel 222b. The focus detection pixel 222a, as shown in FIG. 6(A), is comprised of a microlens 2221a and semicircular shape photoelectric conversion unit 2222a. As shown in the cross-sectional view of FIG. 8(A), the photoelectric conversion unit 2222a is built into the surface of the semiconductor circuit board 213 of the image pickup device 22, while the microlens 2221a is formed on the surface of that. Further, the focus detection pixel 222b, as shown in FIG. 6(B), is comprised of a microlens 2221b and photoelectric conversion unit 2222b. As shown by the cross-sectional view of FIG. 8(B), the photoelectric conversion unit 2222b is built into the surface of the semiconductor circuit board 213 of the image pickup device 22, while the microlens 2221b is formed on the surface of that. Further, these focus detection pixels 222a and 222b, as shown in FIG. 3 and FIG. 4, are arranged mutually adjoining each other in a horizontal string or vertical string so as to form the focus detection pixel strings 22a to 22e which are shown in FIG. 2.

Figure 10:
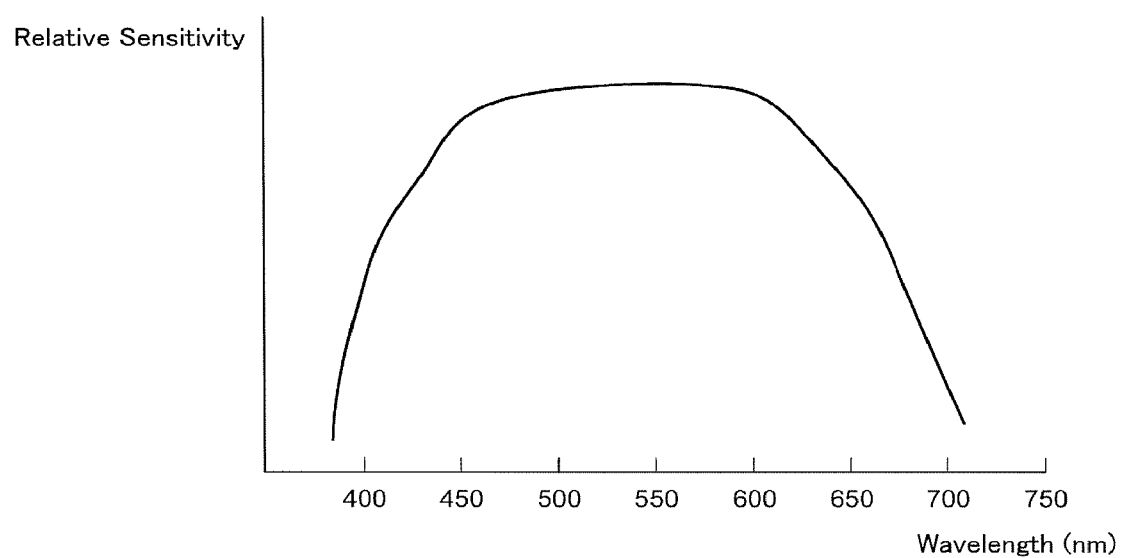
FIG. 10 is a spectral graph which shows a relative sensitivity with respect to wavelength of a focus detection pixel.

Note that, the photoelectric conversion units 2222a, 2222b of the focus detection pixels 222a, 222b are shaped to receive the light beams which run from the microlenses 2221a, 2221b through a predetermined region (for example, F2.8) of the exit pupil of the imaging optical system. Further, the focus detection pixels 222a, 222b are not provided with color filters. Their spectral characteristics are combinations of the spectral characteristics of the photodiodes which perform the photoelectric conversion and the spectral characteristics of not shown infrared cut filters. FIG. 10 shows the spectral characteristics of the focus detection pixels 222a, 222b, but the relative sensitivities are made the spectral characteristics of the added sensitivities of the blue pixels B, green pixels G, and red pixels R of the imaging pixels 221 which are shown in FIG. 9. Further, the optical wavelength regions at which the sensitivities appear are regions including the optical wavelength regions of the sensitivities of the blue pixels B, green pixels G, and red pixels R of the imaging pixels 221 which are shown in FIG. 10. However, it is also possible to provide one of the same color filters as the imaging pixels 221, for example, the green filter. Note that, FIG. 10 is a spectral graph which shows the relative sensitivities of the focus detection pixels which are shown in FIG. 3 and FIG. 4 with respect to wavelength.

Further, the photoelectric conversion units 2222a, 2222b of the focus detection pixels 222a, 222b which are shown in FIG. 6(A) and FIG. 6(B) are made semicircular shapes, but the shapes of the photoelectric conversion units 2222a and 2222b are not limited to this. Other shapes, for example, oval shapes, rectangular shapes, and polygonal shapes can also be used.

Here, the so-called "phase difference detection system" which detects the focused state of the imaging optical system based on the pixel outputs of the focus detection pixels 222a, 222b will be explained.

Figure 11:
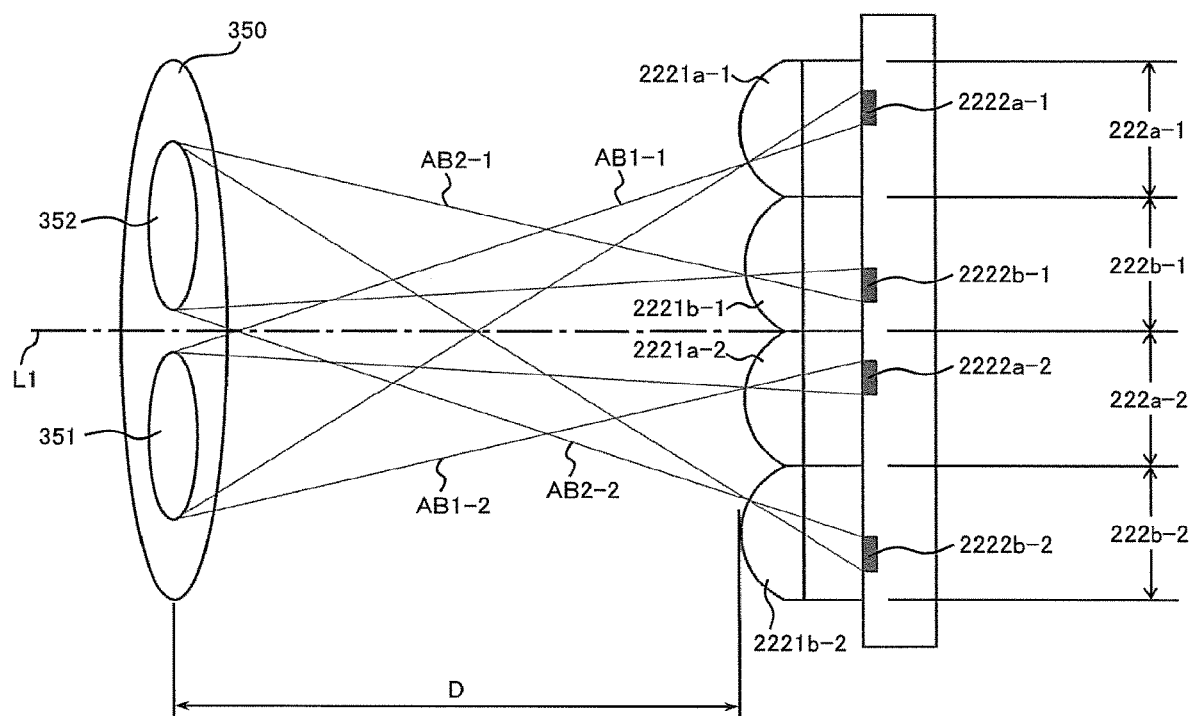
FIG. 11 is a cross-sectional view along the line XI-XI of FIG. 3 and FIG. 4.

FIG. 11 is a cross-sectional view along the line XI-XI of FIG. 3 and FIG. 4 and shows the focus detection pixels 222a-1, 222b-1, 222a-2, and 222b-2 which are arranged near the imaging optical axis L1 and adjoin each other receiving the light beams AB1-1, AB2-1, AB1-2, and AB2-2 which are emitted from the distance measuring pupils 351, 352 of the exit pupil 350. Note that, in FIG. 11, among the plurality of focus detection pixels 222a, 222b, only the ones which are positioned near the imaging optical axis L are shown as examples, but the other focus detection pixels other than the focus detection pixels which are shown in FIG. 11 are similarly configured to receive the light beams which are emitted from the pair of distance measuring pupils 351, 352.

Here, the "exit pupil 350" is an image which is set at the position of the distance D in front of the microlenses 2221a, 2221b of the focus detection pixels 222a, 222b which are arranged at the predetermined focus plane of the imaging optical system. The distance D is the value unambiguously determined in accordance with the curvature of the microlens, refractive index, distance between the microlens and the photoelectric conversion unit, etc. This distance D is called the "distance measuring pupil distance". Further, the "distance measuring pupils 351, 352" are images of the photoelectric conversion units 2222a, 2222b which are projected by the microlenses 2221a, 2221b of the focus detection pixels 222a, 222b.

Note that, in FIG. 11, the direction of arrangement of the focus detection pixels 222a-1, 222b-1, 222a-2, and 222b-2 matches the direction of arrangement of the pair of distance measuring pupils 351, 352.

Further, as shown in FIG. 11, the microlenses 2221a-1, 2221b-1, 2221a-2, and 2221b-2 of the focus detection pixels 222a-1, 222b-1, 222a-2, and 222b-2 are arranged near the predetermined focal plane of the imaging optical system. Further, the shapes of the photoelectric conversion units 2222a-1, 2222b-1, 2222a-2, and 2222b-2 which are arranged behind the microlenses 2221a-1, 2221b-1, 2221a-2, and 2221b-2 are projected on the exit pupil 350 which is separated from the microlenses 2221a-1, 2221b-1, 2221a-2, and 2221b-2 by exactly the distance measurement distance D. The projected shapes form the distance measuring pupils 351, 352.

That is, the relative positional relationships of the microlenses and the photoelectric conversion units at the focus detection pixels are set so that the projected shapes (distance measuring pupils 351, 352) of the photoelectric conversion units of the focus detection pixels match on the exit pupil 350 at the distance measurement distance D. Due to this, the direction of projection of the photoelectric conversion units at the focus detection pixels is determined.

As shown in FIG. 11, the photoelectric conversion unit 2222a-1 of the focus detection pixel 222a-1 outputs a signal corresponding to the strength of the image which is formed on the microlens 2221a-1 by the light beam AB1-1 which passes through the distance measuring pupil 351 and heads toward the microlens 2221a-1. Similarly, the photoelectric conversion unit 2222a-2 of the focus detection pixel 222a-2 outputs a signal corresponding to the strength of the image which is formed on the microlens 2221a-2 by the light beam AB1-2 which passes through the distance measuring pupil 351 and heads toward the microlens 2221a-2.

Further, the photoelectric conversion unit 2222b-1 of the focus detection pixel 222b-1 outputs a signal corresponding to the strength of the image which is formed on the microlens 2221b-1 by the light beam AB2-1 which passes through the distance measuring pupil 352 and heads toward the microlens 2221b-1. Similarly, the photoelectric conversion unit 2222b-2 of the focus detection pixel 222b-2 outputs a signal corresponding to the strength of the image which is formed on the microlens 2221b-2 by the light beam AB2-2 which passes through the distance measuring pupil 352 and heads toward the microlens 2221b-2.

Further, by arranging the two types of focus detection pixels 222a, 222b in a straight line as shown in FIG. 3 and FIG. 4 and grouping the outputs of the photoelectric conversion units 2222a, 2222b of the focus detection pixels 222a, 222b into output groups corresponding to the distance measuring pupil 351 and distance measuring pupil 352, data is obtained relating to the strength distribution of the pair of images which the focus detection beams which pass through the distance measuring pupil 351 and the distance measuring pupil 352 form on the focus detection pixel strings. Further, this strength distribution data can be processed by correlation operations or phase difference detection or other image deviation detection operations so as to detect the amount of image deviation by the so-called phase difference detection system.

Further, by processing the obtained amount of image deviation by conversion corresponding to the interval between the centers of gravity of the pair of distance measuring pupils, it is possible to find the deviation of the current focal plane with respect to the predetermined focal plane (focal plane at focus detection position corresponding to position of microlens array on predetermined focal plane), that is, the amount of defocus.

Note that, the operation on the image deviation by the phase difference detection system and the operation on the amount of defocus based on this are performed by the camera control unit 21.

Further, the camera control unit 21 reads out the outputs of the imaging pixels 221 of the image pickup device 22 and uses the read pixel outputs as the basis to calculate the focus evaluation values. The focus evaluation values can, for example, be found by extracting the high frequency components of the image outputs from the imaging pixels 221 of the image pickup device 22 by using a high frequency pass filter and cumulatively adding the same. Further, they can be found by using two high frequency pass filters with different cutoff frequencies to extract the high frequency components and cumulatively adding the same.

Further, the camera control unit 21 sends the lens control unit 37 a control signal to drive the focus lens 32 by a predetermined sampling interval (distance), finds the focus evaluation values at the respective positions, and finds the position at which the focus evaluation value becomes the largest as the focused position, that is, detects the focus by the contrast detection system. Note that, when driving the focus lens 32 while calculating the focus evaluation values and the focus evaluation value rises two times, then falls two times, this focused position can, for example, be found by calculation by interpolation etc. using these focus evaluation values.

Figure 12:
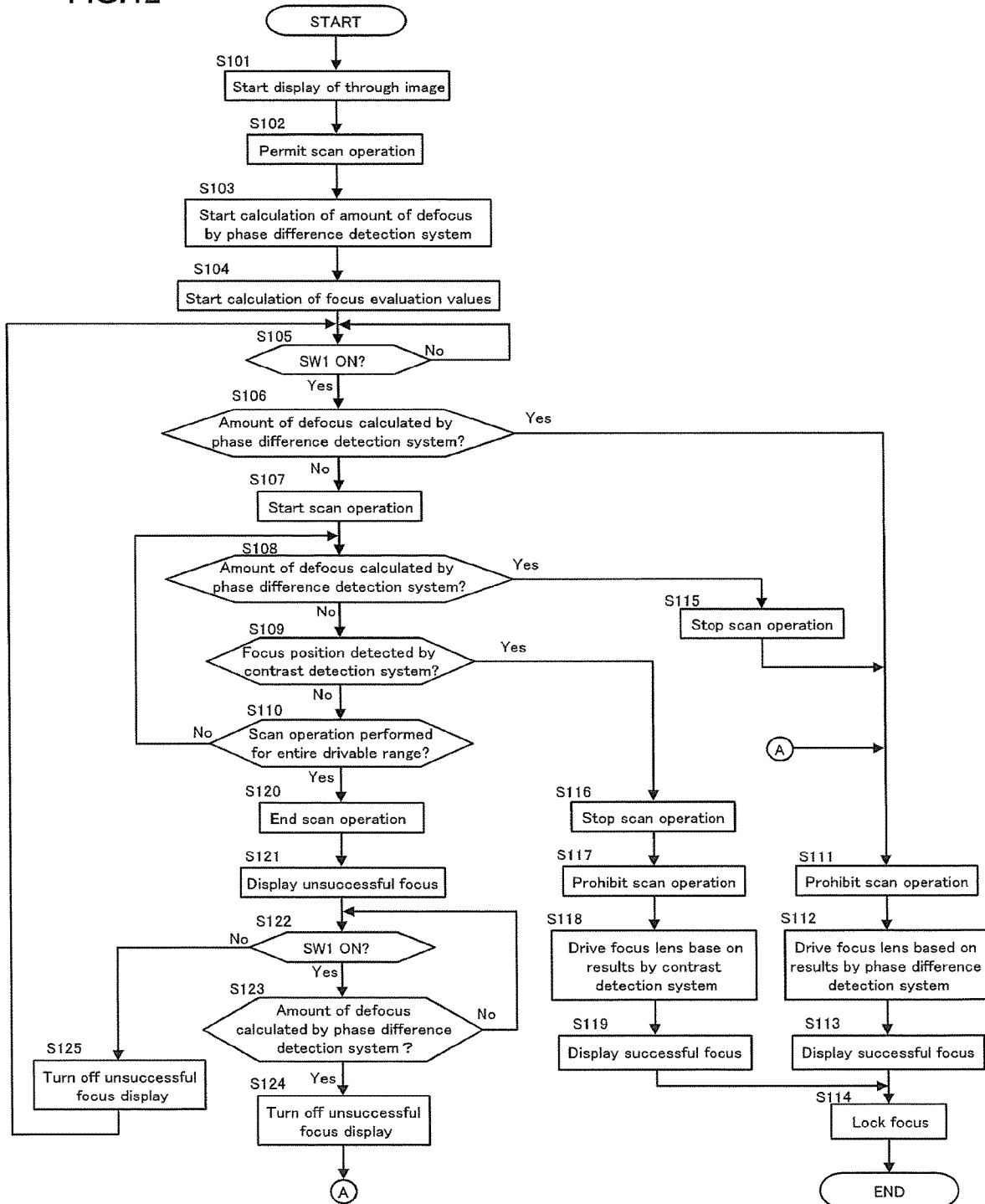
FIG. 12 is a flow chart which shows an example of operation of a camera according to a first embodiment.

Next, an example of the operation of the camera 1 according to the first embodiment will be explained. FIG. 12 is a flow chart which shows the operation of the camera 1 according to the first embodiment. Note that, the following operation is started by the power of the camera 1 being turned on. Further, below, the case where the one-shot mode, that is, the mode of fixing the once adjusted position of the focus lens 32 and capturing an image at that focus lens position, is selected will be explained as an example.

First, at step S101, the production of a through image by the camera control unit 21 and display of the through image by the electronic viewfinder 26 of the viewing optical system are started. Specifically, the image pickup device 22 is used to perform an exposure operation, while the camera control unit 21 is used to read pixel data of the imaging pixels 221. Further, the camera control unit 21 produces a through image based on the read data. The produced through image is sent to the liquid crystal drive circuit 25 where it is displayed on the electronic viewfinder 26 of the viewing optical system. Further, due to this, the user can view the moving image of an object through the ocular lens 27. Note that, the through image is produced and the through image is displayed repeatedly at a predetermined interval.

Next, at step S102, the camera control unit 21 is used to send a scan operation permission instruction to the lens control unit 37 whereupon a scan operation is permitted. Note that, the scan operation will be explained later.

At step S103, the camera control unit 21 is used to start processing for calculation of the amount of defocus by the phase difference detection system. In the present embodiment, the processing for calculation of the amount of defocus by the phase difference detection system is performed as follows: That is, first, the camera control unit 21 is used to read the pair of image data corresponding to a pair of images from the focus detection pixels 222a, 222b forming the five focus detection pixel strings 22a to 22e of the image pickup device 22. In this case, when a specific focus detection position is selected by manual operation by the user, it is also possible to read only the data from the focus detection pixels corresponding to that focus detection position. Further, the camera control unit 21 uses the read pair of image data as the basis to perform processing for detection of image deviation (correlation processing). It computes the amounts of image deviation for the focus detection positions corresponding to the five focus detection pixel strings 22*a* to 22*e* and furthermore converts the amounts of image deviation to amounts of defocus. Further, the camera control unit 21 evaluates the reliability of the calculated amounts of defocus. Note that, the reliability of an amount of defocus is evaluated based on, for example, the degree of match of the pair of image data, the contrast, etc.

Further, this processing for calculation of the amount of defocus by the phase difference detection system is repeated at a predetermined interval until a focus lock (processing for prohibiting drive of the focus lens 32) at the later explained step S114.

At step S104, the camera control unit 21 is used to start processing for calculation of focus evaluation values. In the present embodiment, the camera control unit 21 reads the pixel outputs of the imaging pixels 221 of the image pickup device 22, extracts the high frequency components of the read pixel outputs using a high frequency pass filter, and cumulatively adds the same in the processing for calculation of focus evaluation values. The focus evaluation values may be calculated by reading only the pixel outputs of the imaging pixels 221 corresponding to a selected focus detection position when a specific focus detection position is selected by manual operation of the user or by an object recognition mode etc. Note that, the processing for calculation of the focus evaluation values is performed repeatedly at a predetermined interval until a focus lock at the later explained step S114.

At step S105, the camera control unit 21 is used to judge if the shutter release button which is provided at the operating unit 28 is half pressed (first switch SW1 on). When the first switch SW1 is on, the routine proceeds to step S106. On the other hand, when the first switch SW1 is not on, step S105 is repeated until the first switch SW1 becomes on. That is, until the first switch SW1 becomes on, the through image is produced and displayed and the processing for calculation of the amount of defocus by the phase difference detection system and the processing for calculation of the focus evaluation values are performed repeatedly.

At step S106, the camera control unit 21 is used to judge if the amount of defocus could be calculated by the phase difference detection system. If the amount of defocus could be calculated, it is judged that the distance can be measured and the routine proceeds to step S111. On the other hand, if the amount of defocus could not be calculated, it is judged that the distance cannot be measured and the routine proceeds to step S107. Note that, in the present embodiment, even when the amount of defocus can be calculated, if the reliability of the calculated amount of defocus is low, this is treated as if the amount of defocus could not be calculated and the routine proceeds to step S107. In the present embodiment, for example, if the contrast of the object is low, if the object is an ultralow brightness object, if the object is an ultrahigh brightness object, etc., it is judged that the reliability of the amount of defocus is low.

Note that, at step S106, the results of the most recent single time of processing for calculation of the amount of defocus may be used for performing the above judgment, but it is also possible to judge that the distance cannot be measured when the amount of defocus could not be calculated consecutively or when the reliability of the amount of defocus is consecutively low in the several most recent times of processing for calculation of amount of defocus and then proceed to step S107 or conversely judge that the distance can be measured when the amount of defocus could be calculated even once in the several most recent times of processing for calculation of amount of defocus and then proceed to step S111.

When it is judged at step S106 that the amount of defocus could be calculated and it is judged that the distance could be measured, the routine proceeds to step S111. At steps S111 to S114, the amount of defocus which was calculated by the phase difference detection system is used as the basis to perform a focus operation.

That is, first, at step S111, the camera control unit 21 is used to perform processing for prohibition of a scan operation. Specifically, the camera control unit 21 is used to send a scan operation prohibition instruction to the lens control unit 37 whereby a scan operation is prohibited. Note that, the scan operation will be explained later.

At step S112, the amount of defocus which was calculated by the phase difference detection system at step S103 is used as the basis to perform processing to drive the focus lens 32 to the focused position. Specifically, the camera control unit 21 is used to calculate the amount of lens drive which is required for driving the focus lens to the focused position from the amount of defocus which was calculated by the phase difference detection system and to send the calculated amount of lens drive through the lens control unit 37 to the lens drive motor 36. Further, the lens drive motor 36 uses the amount of lens drive which was calculated by the camera control unit 21 as the basis to drive the focus lens 32 to the focused position.

Note that, in the present embodiment, even while driving the lens drive motor 36 and driving the focus lens 32 to the focused position, the control unit 21 repeatedly calculates the amount of defocus by the phase difference detection system. When, as a result, a new amount of defocus could be calculated, the control unit 21 uses the new amount of defocus as the basis to drive the focus lens 32.

Further, when the focus lens 32 finishes being driven to the focused position, the routine proceeds to step S113, where successful focus is displayed, then the routine proceeds to step S114 where the focus is locked (processing for prohibiting drive of the focus lens 32). Note that, successful focus is displayed at step S113 by, for example, the electronic viewfinder 26. Further, when displaying successful focus, it is also possible display the fact of the phase difference detection system performing the focus operation to inform this to the user.

On the other hand, when, at step S106, it is judged that the amount of defocus could not be calculated or when it is judged that the reliability of the calculated amount of defocus is low, the routine proceeds to step S107. At step S107, the camera control unit 21 is used to perform processing to start the scan operation. In the scan operation of the present embodiment, the focus lens drive motor 36 is used to drive the focus lens 32 for scanning while the camera control unit 21 is used to perform the calculation of the amount of defocus and calculation of the focus evaluation values by the phase difference detection system simultaneously at a predetermined interval. Due to this, the detection of the focused position by the phase difference detection system and the detection of the focused position by the contrast detection system are performed simultaneously at a predetermined interval.

Specifically, the camera control unit 21 sends the lens control unit 37 a scan drive start instruction, then the lens control unit 37 uses the instruction from the camera control unit 21 as the basis to drive the focus lens drive motor 36 and drive the focus lens 32 along the optical axis L1 by a scan operation. Note that, the scan drive operation of the focus lens 32 may be performed from the infinite end to the near end or may be performed from the near end to the infinite end.

Further, the camera control unit 21 drives the focus lens 32 while reading pairs of image data corresponding to pairs of images from the focus detection pixels 222a, 222b of the image pickup device 22 at a predetermined interval. Therefore the camera control unit 21 calculate the amount of defocus by the phase difference detection system based on the read image data from the focus detection pixels 222a, 222b and evaluate the reliability of the calculated amount of defocus, while reading the pixel outputs from the imaging pixels 221 of the image pickup device 22 at a predetermined interval during driving the focus lens 32 and calculating the focus evaluation values based on the read pixel outputs from the imaging pixels 221 so as to obtain focus evaluation values at different focus lens positions and detect the focused position by the contrast detection system.

At step S108, the camera control unit 21 is used to judge if the amount of defocus could be calculated by the phase difference detection system as the result of a scan operation. If the amount of defocus could be calculated, it judges that the distance could be measured and the routine proceeds to step S115. On the other hand, when the amount of defocus could not be calculated, it is judged that measurement of the distance is impossible and the routine proceeds to step S109. Note that, at step S108, in the same way as step S106, even when the amount of defocus could be calculated, if the reliability of the calculated amount of defocus is low, this is treated as the amount of defocus not having been able to be calculated and the routine proceeds to step S109.

At step S109, the camera control unit 21 is used to judge if the focused position could be detected by the contrast detection system as the result of a scan operation. If the focused position could be detected, the routine proceeds to step S116, while if the focused position could not be detected, the routine proceeds to step S110.

At step S110, the camera control unit 21 is used to judge if the scan operation was performed over the entire drivable range of the focus lens 32. When the scan operation was not performed over the entire drivable range of the focus lens 32, the routine returns to step S108. By repeating steps S108 to S110, a scan operation, that is, drive of the focus lens 32 for a scan, is performed while the operation is continued of performing the calculation of the amount of defocus by the phase difference detection system and the detection of the focused position by the contrast detection system simultaneously at a predetermined interval. On the other hand, when the scan operation is completed over the entire drivable range of the focus lens 32, the routine proceeds to step S120.

Further, when, as a result of performing the scan operation, at step S108, it is judged that the phase difference detection system could be used to detect the amount of defocus, the routine proceeds to step S115. At steps S115 and S111 to S114, the amount of defocus which was calculated by the phase difference detection system is used as the basis to perform the focus operation.

That is, first, at step S115, the camera control unit 21 is used to perform processing to stop a scan operation, then the routine proceeds to step S111, where the camera control unit 21 is used to perform processing for prohibiting a scan operation.

Further, the routine proceeds to step S112 where, in the same way as above, the amount of defocus which was calculated by the phase difference detection system is used as the basis to perform processing for driving the focus lens 32 to the focused position, then the routine proceeds to step S113 where successful focus is displayed, then, at step S114, the focus is locked.

Further, when, as a result of performing the scan operation, at step S109, it is judged that the contrast detection system could be used to detect the focus position, the routine proceeds to step S116. At steps S116 to S119, the focused position which was detected by the contrast detection system is used as the basis to perform a focus operation.

That is, first, at step S116, the camera control unit 21 is used to performs processing for stopping the scan operation, then the routine proceeds to step S117 where, in the same way the step S111, the camera control unit 21 is used to perform processing for prohibiting a scan operation.

Figure 13:
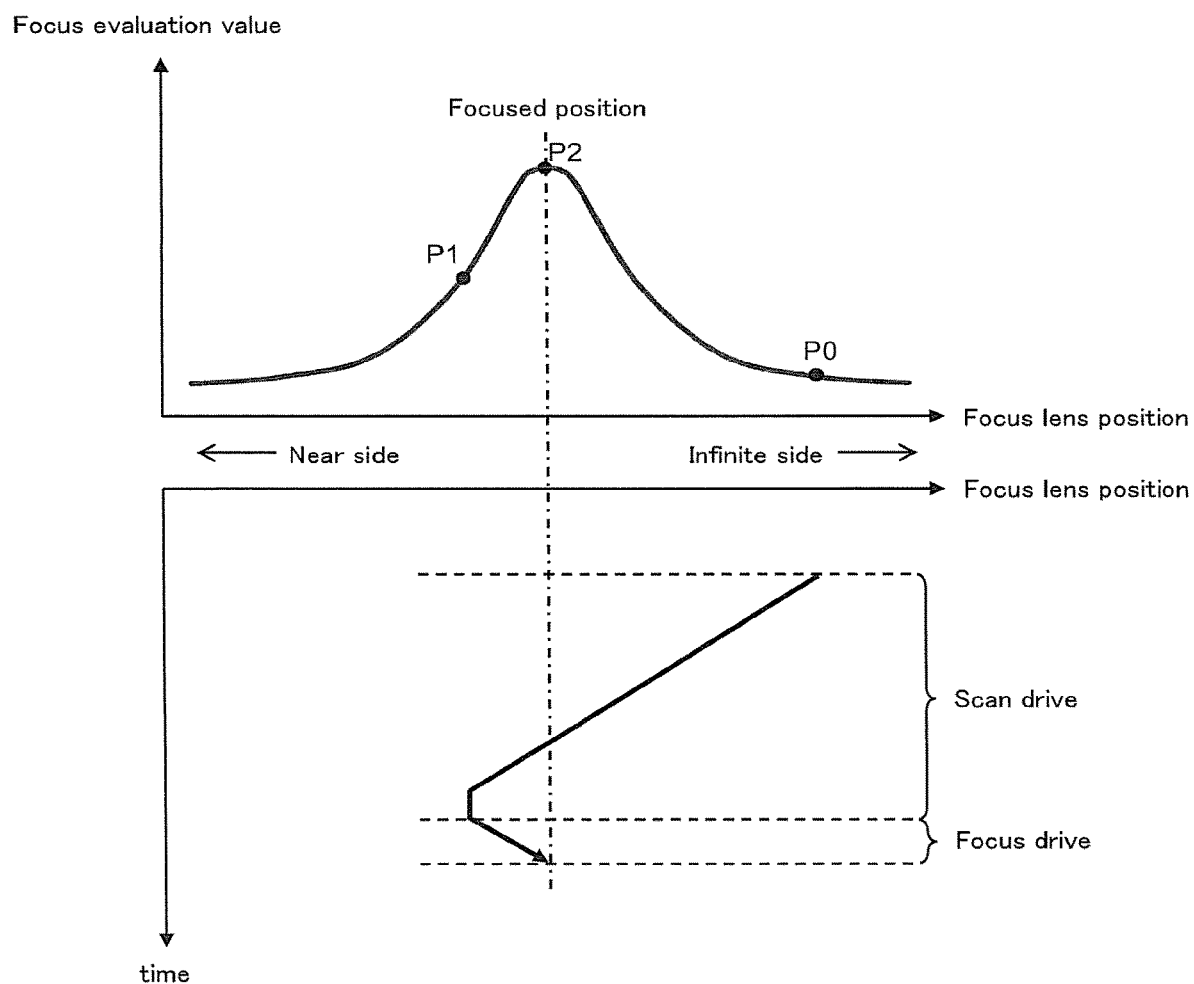
FIG. 13 is a view which shows a relationship between a focus lens position and focus evaluation values and a relationship between a focus lens position and time in a scan operation according to the present embodiment.

Further, the routine proceeds to step S118 where the focused position which was detected by the contrast detection system is used as the basis to perform focus drive processing for driving the focus lens 32 to the focused position. Here, FIG. 13 is a view which shows the relationship between the focus lens position and the focus evaluation values and the relationship between the focus lens position and time in the case where the focused position could be detected by the contrast detection system as the result of a scan operation. As shown in FIG. 13, when the scan operation is started, the focus lens 32 is positioned at P0 which is shown in FIG. 13. From P0, the focus lens 32 is driven from the infinite side to the near side while acquiring the focus evaluation values. Further, if the peak position (focused position) of the focus evaluation values is detected at the point of time when making the focus lens 32 move to the position of P1 which is shown in FIG. 13 (step S109=Yes), the scan operation is stopped (step S116), processing is performed to prohibit the scan operation (step S117), then a focus drive operation is performed to drive the focus lens 32 to the focused position (in FIG. 13, position of P2) (step S118).

Note that, in the present embodiment, at step S109, it is judged that the contrast detection system could be used to detect the focused position and the results of detection by the contrast detection system are used as the basis to drive the focus lens 32 to the focused position. At that time, until the focus lens 32 finishes being driven to the focused position, drive of the focus lens 32 based on the results of focus detection by the phase difference detection system is prohibited. That is, after it is judged that the focus position could be detected by the contrast detection system, even when the amount of defocus could be calculated by the phase difference detection system, drive of the focus lens 32 based on the results of the phase difference detection system is prohibited. Due to this, the hunting phenomenon of the focus lens 32 can be suppressed.

Further, when the focus lens 32 has finished being driven to the focused position, the routine proceeds to step S119 where successful focus is displayed, then the routine proceeds to step S114 where the focus is locked (processing to prohibit drive of the focus lens 32). Note that, successful focus is displayed at step S119 by, for example, the electronic viewfinder 26. Further, when displaying successful focus, it is also possible display the fact of the contrast detection system performing the focus operation to inform this to the user.

Note that, in the scan operation of the present embodiment, by repeating steps S108 to S110, Calculation of the amount of defocus by the phase difference detection system and the detection of the focused position by the contrast detection system are performed simultaneously at a predetermined interval while the focus lens 32 is driven for a scan. Further, as a result of repeatedly performing steps S108 to S110, the results of focus detection by the detection system, between the phase difference detection system and contrast detection system, by which the amount of defocus could be calculated or the focused position could be detected first, are used to perform processing to drive the focus lens 32 to the focused position. Further, as explained above, in the scan operation of the present embodiment, it is judged if the phase difference detection system could be used to calculate the amount of defocus (step S108), then it is judged if the contrast detection system could be used to detect the focused position (step S109). Due to this, when the amount of defocus could be calculated and the focused position could be detected by the phase difference detection system and the contrast detection system at the same timing, the results of focus detection by the phase difference detection system are employed with priority over the results of focus detection by the contrast detection system.

On the other hand, when it was judged at step S110 that the scan operation has finished being performed over entire drivable range of the focus lens 32, the routine proceeds to step S120. At step S120, the result of the scan operation shows focus detection was not possible by either of the phase difference detection system or contrast detection system, so processing is performed to end the scan operation, then the routine proceeds to step S121, where unsuccessful focus is displayed. Unsuccessful focus is displayed, for example, by the electronic viewfinder 26.

Further, the routine proceeds to step S122 where the camera control unit 21 is used to judge if the state where the shutter release button is half pressed (first switch SW1 on) continues. When the first switch SW1 is on, the routine proceeds to step S123, while when the first switch SW1 is off, the routine proceeds to step S125.

When, at step S122, it is judged that the first switch SW1 is on, the routine proceeds to step S123 where, in the same way the above step S106, it is judged if the amount of defocus could be detected by the phase difference detection system. When, as a result, it is judged that the amount of defocus could be calculated, the routine proceeds to step S124 where processing is performed to turn off the display of unsuccessful focus, then the routine proceeds to step S111. At steps S111 to S114, a focus operation is performed based on the amount of defocus which was calculated by the phase difference detection system. On the other hand, when it is judged that the amount of defocus could not be calculated, the routine returns to step S122. While the state where the first switch SW1 is on continues, steps S122 and S123 are repeatedly executed. Note that, in this case, the focus lens 32 is in the stopped state, so focus detection by the contrast detection system is not performed. Only focus detection by the phase difference detection system is performed.

On the other hand, when it is judged at step S121 that the first switch SW1 is off, the routine proceeds to step S125 where processing is performed to turn off the display of unsuccessful focus, then the routine returns to step S105.

In the first embodiment, the camera 1 operates in the following way.

As explained above, in the first embodiment, first, the phase difference detection system is used to calculate the amount of defocus. When the amount of defocus could be calculated, the calculated amount of defocus is used as the basis to drive the focus lens 32 to the focused position, while when the amount of defocus could not be calculated, a scan operation is performed which executes the calculation of the amount of defocus by the phase difference detection system and the detection of the focused position by the contrast detection system simultaneously during driving the focus lens 32 for scanning. Further, as a result of performing a scan operation, processing is performed to drive the focused lens 32 to the focused position using the results of focus detection by the detection system, between the phase difference detection system and contrast detection system, by which the amount of defocus could be calculated or the focused position could be detected first. Therefore, according to the present embodiment, when it is difficult to use the phase difference detection system to detect the focused state of the imaging optical system (for example, when capturing the image of objects with the same reflection rates and different colors) or when it is difficult to use the contrast detection system to detect the focused state of the imaging optical system (for example, when capturing the image of an object with a low brightness), it is possible to suitably adjust the focus of the imaging optical system. Further, according to the present embodiment, to simultaneously perform calculation of the amount of defocus by the phase difference detection system and detection of the focused position by the contrast detection system and use the system by which the focus could first be detected so as to adjust the focus of the imaging optical system, it is possible to adjust the focus of the imaging optical system in a shorter time compared with the prior art (that is, the art of using, first, the phase difference detection system to drive the focus lens 32 to near the focused posit ion, then using the contrast detection system to detect the focused position near the focused position).

Second Embodiment

Figure 14:
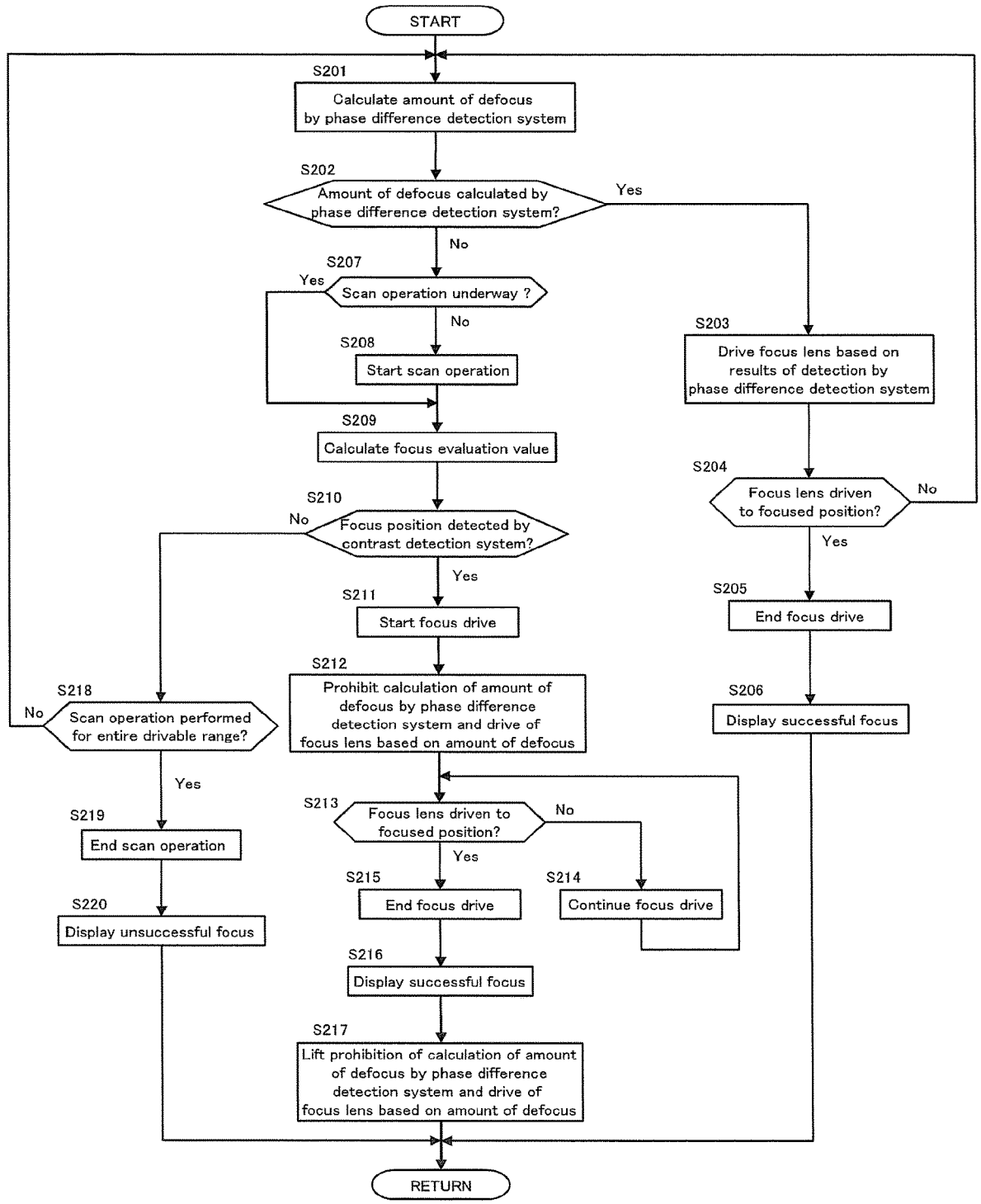
FIG. 14 is a flow chart which shows an example of operation of a camera according to a second embodiment.

Next, a second embodiment of the present invention will be explained based on the drawings. The second embodiment is similar to the first embodiment other than, as shown in FIG. 14, the operation of the camera 1 in the camera 1 which is shown in FIG. 1. FIG. 14 is a flow chart which shows the operation of the camera 1 according to the second embodiment. Note that, the following operation is started by the power of the camera 1 being turned on and the shutter release button which is provided at the operating unit 28 being half pressed (first switch SW1 on). Further, below, the explanation will be given with respect to the example of the continuous mode, that is, the mode of continuously detecting the focused state of the optical system and thereby capturing an image at a focus lens position corresponding to the object without fixing the position of the focus lens 32, being selected.

At step S201, in the same way as step S103 of the first embodiment, processing for calculating the amount of defocus by the phase difference detection system is performed. Further, at step S202, in the same way as step S106 of the first embodiment, it is judged if the amount of defocus could be calculated by the phase difference detection system. If the amount of defocus could be calculated, it is judged that the distance can be measured and the routine proceeds to step S203. On the other hand, if the amount of defocus could not be calculated, it is judged that the distance cannot be measured and the routine proceeds to step S207. Note that, in the second embodiment as well, even if the amount of defocus could be calculated, if the reliability of the calculated amount of defocus is low, this is treated as the case where that the amount of defocus could not be calculated and the routine proceeds to step S207.

At step S203, it is judged that the phase difference detection system could be used to calculate the amount of defocus and it is judged that the distance can be measured, so the camera control unit 21 can be used to use the amount of defocus which was calculated at step S201 to perform a focus operation.

That is, at step S203, the amount of defocus which is calculated by the phase difference detection system is used as the basis for processing for driving the focus lens 32 to the focused position. Specifically, the camera control unit 21 is used to calculate the amount of lens drive which becomes necessary for driving the focus lens 32 to the focused position from the amount of defocus which was calculated by the phase difference detection system and sends the calculated amount of lens drive through the lens control unit 37 to the focus lens drive motor 36. Further, the focus lens drive motor 36 uses the amount of lens drive which was calculated by the camera control unit 21 as the basis to drive the focus lens 32 to the focused position.

Note that, in second embodiment, at step S203, even while driving the focus lens drive motor 36 and driving the focus lens 32 to the focused position, the routine proceeds to step S204, where the camera control unit 21 is used to judge if the focus lens 32 has been driven to the focused position. When the focus lens 32 is not driven to the focused position (step S204=No), the routine returns to step S201. Due to this, the focus lens 32 is driven to the focused position while the phase difference detection system calculates the amount of defocus (step S201). Further, if a new amount of defocus is calculated while driving the focus lens 32 to the focused position, the camera control unit 21 uses the new amount of defocus as the basis to drive the focus lens 32.

On the other hand, when the focus lens 32 finishes being driven to the focused position (step S204=Yes), the routine proceeds to step S205 where the focus drive operation of the focus lens 32 is ended, then the routine proceeds to step S206, where successful focus is displayed. Further, after successful focus is displayed, the routine returns to step S201 where this focus adjustment processing is repeated. Note that, successful focus is displayed at step S206 by, for example, the electronic viewfinder 26. Further, when displaying successful focus, it is also possible display the fact of the phase difference detection system performing the focus operation to inform this to the user.

In this way, in the present embodiment, while the phase difference detection system can be used to calculate the amount of defocus (step S202=Yes), the focus lens 32 is driven based on the amount of defocus which was calculated by the phase difference detection system. On the other hand, when it is judged that the phase difference detection system could not be used to calculate the amount of defocus or when it is judged that the reliability of the calculated amount of defocus is low (step S202=No), the routine proceeds to step S207.

At step S207, the camera control unit 21 is used to judge if a scan operation is being performed. When it is judged that a scan operation is not being performed, the routine proceeds to step S208 to start a scan operation, while when it is judged that a scan operation is being performed, the routine proceeds to step S209.

At step S208, in the same way as step S107 of the first embodiment, the camera control unit 21 is used to start a scan operation in which detection of the focused position by the phase difference detection system and detection of the focused position by the contrast detection system are performed at a predetermined interval simultaneously in parallel. Further, at step S209, the camera control unit 21 is used to perform processing to calculate the focus evaluation values for focus detection by the contrast detection system in the scan operation. In the present embodiment, the processing for calculation of the focus evaluation values is performed by reading out the pixel outputs from the imaging pixels 221 of the image pickup device 22, extracting the high frequency components of the read pixel outputs using a high frequency pass filter, and cumulatively adding the same. A focus evaluation value may be calculated by reading only the pixel outputs of the imaging pixels 221 corresponding to a selected focus detection position when a specific focus detection position is selected by manual operation of the user or by an object recognition mode etc.

At step S210, the camera control unit 21 is used to judge if the focused position could be detected by the contrast detection system as the results of a scan operation. When the contrast detection system could be used to detect the focused position, the routine proceeds to step S211, while when it could not be used to detect the focused position, the routine proceeds to step S218.

At step S211, in the same way as step S118 of the first embodiment, the camera control unit 21 is used to start the processing for a focus drive operation which uses the focused position which was detected by the contrast detection system as the basis to drive the focus lens 32 to the focused position.

Further, at step S212, the focus lens 32 is being driven to the focused position which was detected by the contrast detection system, so the camera control unit 21 is used to perform processing for prohibiting calculation of the amount of defocus by the phase difference detection system. Further, at step S212, it also performs processing to prohibit the drive of the focus lens 32 based on the amount of defocus.

Further, at step S213, the camera control unit 21 is used to judge if the focus lens 32 was driven to the focused position. When the focus lens 32 was not driven to the focused position, the camera control unit 21 judge that the focus drive operation continues and the routine proceeds to step S214 where the focus drive operation continues. Due to this the focus drive operation is performed until the focus lens 32 is driven to the focused position. Note that, at step S213, the camera control unit 21 can judge that the focus lens 32 has been driven to the focused position not only when the focus lens 32 has been driven to the focused position, but also when the focus lens 32 has been driven to near the focused position (for example, position where lens position of focus lens 32 becomes within depth of focus including image plane corresponding to focused position).

On the other hand, when, at step S213, the focus lens 32 was driven to the focused position, the routine proceeds to step S215 where the focus drive operation of the focus lens 32 is ended, then the routine proceeds to step S216 where successful focus is displayed. Note that, successful focus is displayed at step S216 by, for example, the electronic view finder 26. Further, when displaying successful focus, it is also possible display the fact of the contrast detection system performing the focus operation to inform this to the user.

At step S217, the camera control unit 21 is used to perform processing to lift the prohibition on the calculation of the amount of defocus by the phase difference detection system. Further, at step S217, along with the lifting of the prohibition of the calculation of the amount of defocus by the phase difference detection system, it performs processing to lift the prohibition on drive of the focus lens 32 based on the amount of defocus. Further, after the prohibition on the calculation of the amount of defocus by the phase difference detection system and the drive of the focus lens 32 based on the amount of defocus is lifted at step S217, the routine returns to step S201 where the phase difference detection system is used to calculate the amount of defocus.

In this way, in the second embodiment, when the focused position could be detected by the contrast detection system (step S210=Yes), until the focus lens 32 finishes being driven to the focused position which was detected by the contrast detection system, calculation of the amount of defocus by the phase difference detection system and drive of the focus lens 32 based on the amount of defocus are prohibited, so the focus lens 32 can be prevented from being driven to the focused position which was detected by the phase difference detection system while driving the focus lens 32 to the focused position which was detected by the contrast detection system.

On the other hand, when, at step S210, the focused position could not be detected by the contrast detection system, the routine proceeds to step S218. At step S218, the camera control unit 21 is used to judge if a scan operation has been performed over the entire drivable range of the focus lens 32. When a scan operation has not been performed over the entire drivable range of the focus lens 32, the routine returns to step S201. By repeating steps S201 to S210, a scan operation, that is, while driving the focus lens 32, the calculation of the amount of defocus by the phase difference detection system (step S201) and detection of the focused position by the contrast detection system (step S209) are performed simultaneously at a predetermined interval. On the other hand, when the scan operation has finished being performed for the entire drivable range of the focus lens 32, the routine proceeds to step S219.

At step S219, since the results of the scan operation show that focus detection was not possible by either the phase difference detection system or contrast detection system, processing for ending the scan operation is performed, then the routine proceeds to step S220 where unsuccessful focus is displayed. Further, after unsuccessful focus is displayed, the routine returns to step S201 and the above focus adjustment processing is repeated. Note that, unsuccessful focus is displayed at step S220 by, for example, the electronic viewfinder 26.

In the second embodiment, the camera 1 operates as explained above.

In the above way, in the second embodiment, when the results of the scan operation show the focused position could be detected by the contrast detection system, calculation of the amount of defocus by the phase difference detection system and drive of the focus lens 32 based on the amount of defocus are prohibited until the focus lens 32 finishes being driven to the focused position which was detected by the contrast detection system. Therefore, in the second embodiment, it is possible to prevent the focus lens 32 from being driven to the focused position which was detected by the phase difference detection system while the focused position is detected by the contrast detection system and the focus lens 32 is driven to the focused position which is detected by the contrast detection system. Due to this, the hunting phenomenon of the focus lens 32 can be suppressed and the behavior of the focus lens 32 can be stabilized.

Furthermore, according to the second embodiment, if the focused position is could be detected by the contrast detection system, calculation of the amount of defocus by the phase difference detection system and drive of the focus lens 32 based on the amount of defocus are prohibited, so when the focused position can be detected by the contrast detection system, it is possible to perform the focus detection by the contrast detection system with its higher precision of detection of the focused position than focus detection by the phase difference detection system and possible to effectively prevent false focus.

Third Embodiment

Figure 15:
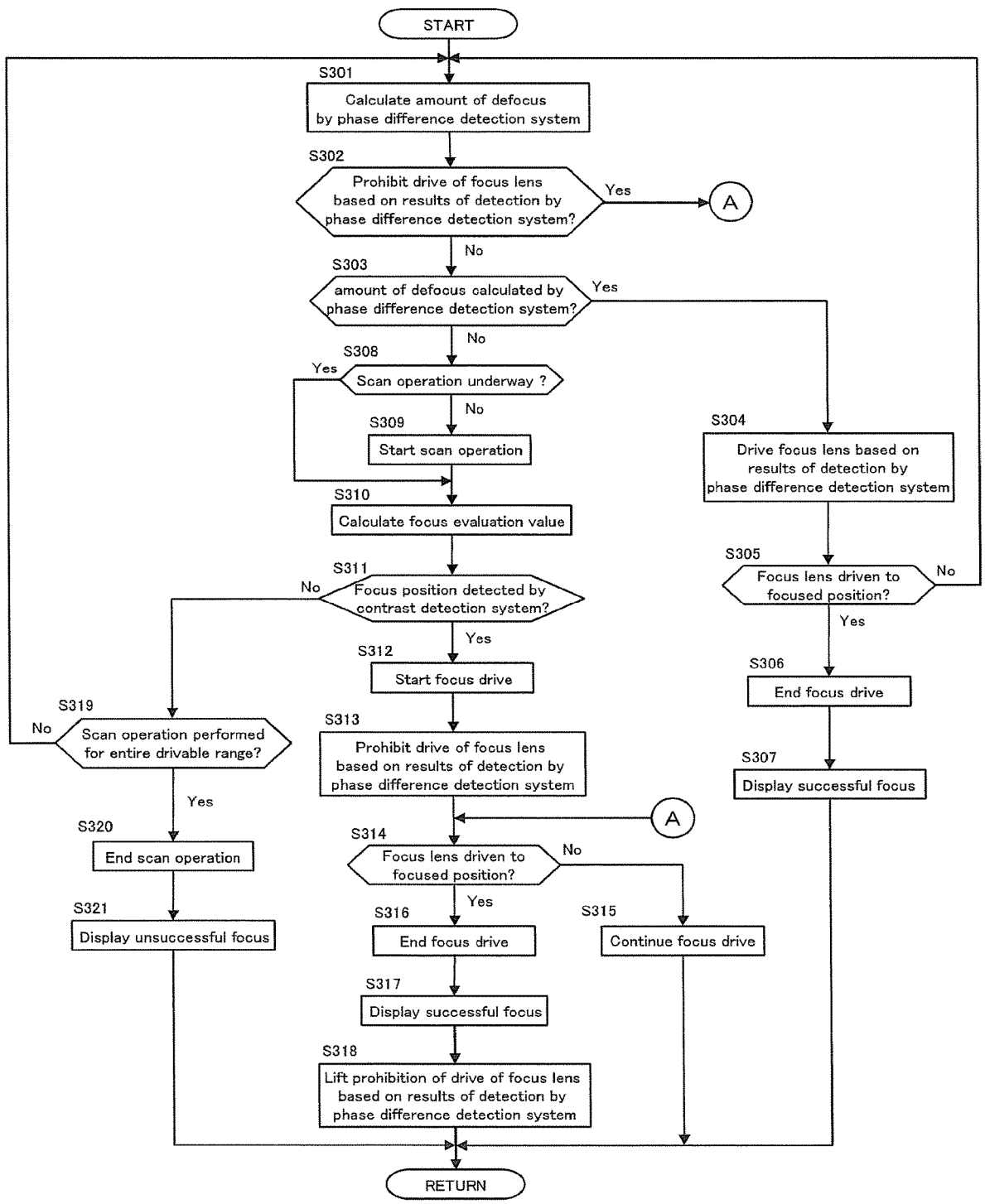
FIG. 15 is a flow chart which shows an example of operation of a camera according to a third embodiment.

Next, a third embodiment of the present invention will be explained based on the drawings. The third embodiment is similar to the first embodiment other than, as shown in FIG. 15, the operation of the camera 1 in the camera 1 which is shown in FIG. 1. Below, referring to FIG. 15, the operation of the camera 1 according to the third embodiment will be explained. Note that, FIG. 15 is a flow chart which shows the operation of the camera 1 according to the third embodiment.

First, as shown in FIG. 15, at step S301, in the same way as step S103 of the first embodiment, the phase difference detection system is used to calculate the amount of defocus. Further, at step S302, the camera control unit 21 is used to judge if the drive of the focus lens 32 based on the results of detection by the phase difference detection system, that is, the drive of the focus lens 32 based on the amount of defocus, is being prohibited. If drive of the focus lens 32 based on the results of detection by the phase difference detection system is prohibited, the routine proceeds to step S314, while if drive of the focus lens 32 based on the results of detection by the phase difference detection system is not prohibited, the routine proceeds to step S303.

At step S303, in the same way as step S106 of the first embodiment, it is judged if the amount of defocus could be calculated by the phase difference detection system. When the phase difference detection system could be used to calculate the amount of defocus, it is judged that the distance can be measured and the routine proceeds to step S304, while if the phase difference detection system cannot be used to calculate the amount of defocus, it is judged that the distance cannot be measured and the routine proceeds to step S308.

At steps S304 to S307, in the same way as steps S203 to S206 of the second embodiment, first, the focus lens 32 is driven based on the amount of defocus (step S304). While the amount of defocus which was calculated by the phase difference detection system is used as the basis to drive the focus lens 32 to the focused position (step S305=No), the calculation of the amount of defocus by the phase difference detection system (step S301) and the drive of the focus lens 32 based on the amount of defocus (step S304) are repeated. Further, when the focus lens 32 has been driven to the focused position (step S305=Yes), the focus drive operation of the focus lens 32 is ended (step S306) and unsuccessful focus is displayed (step S307). Further, after successful focus is displayed, the routine returns to step S301 and this focus adjustment processing is repeated.

On the other hand, if the amount of defocus could not be detected by the phase difference detection system (step S303=No), a scan operation is started (step S309) and the scan operation are performed. that is, while driving the focus lens 32 for a scan operation, the calculation of the amount of defocus by the phase difference detection system (step S301) and the detection of the focused position by the contrast detection system (step S310) are performed simultaneously at a predetermined interval.

In the scan operation, when the focused position (peak of focus evaluation values) was detected by the contrast detection system (step S311=Yes), a focus drive operation for driving the focus lens 32 to the focused position which was detected by the contrast detection system is started (step S312).

Further, at step S313, the focus lens 32 is being driven to the focused position which was detected by the contrast detection system, so processing is performed by the camera control unit 21 to prohibit drive of the focus lens 32 by the results of detection by the phase difference detection system, that is, drive of the focus lens 32 based on the amount of defocus. Note that, in the third embodiment, unlike the second embodiment, calculation of the amount of defocus by the phase difference detection system is not prohibited.

Next, at step S314, it is judged if the focus lens 32 has been driven to the focused position. In the third embodiment, when the focus lens 32 has not been driven to the focused position (step S314=No), the focus drive operation is continued as is (step S315), then the routine returns to step S301 where the calculation of the amount of defocus by the phase difference detection system (step S301) is periodically repeated until the focus lens 32 is driven to the focused position. Further, in the third embodiment, while driving the focus lens 32 to the focused position, drive of the focus lens based on the results of detection by the phase difference detection system is prohibited (step S312, step S303=Yes), so it is possible to prevent the focus lens 32 from being driven to the focused position which was detected by the phase difference detection system until the drive of the focus lens 32 to the focused position which was detected by the contrast detection system is completed.

On the other hand, when the focus lens 32 is driven to the focused position which was detected by the contrast detection system (step S314=Yes), the focus drive operation is ended (step S316) and successful focus is displayed (step S317). Further, at step S318, the drive of the focused lens 32 to the focused position which was detected by the contrast detection system has been finished, so the camera control unit 21 performs processing to lift the prohibition on drive of the focus lens based on the results of detection by the phase difference detection system. After the prohibition on the drive of the focus lens based on the results of detection by the phase difference detection system is lifted, the routine returns to step S301 and this focus adjustment processing is repeated.

Further, when the focused position could be detected by the contrast detection system (step S311=No), it is judged if the scan operation was performed over the entire drivable range of the focus lens 32 (step S319). When the scan operation was performed over the entire drivable range of the focus lens 32, but the focused position could not be detected (step S319=Yes), the scan operation is ended (step S320) and unsuccessful focus is displayed (step S321). Further, after unsuccessful focus is displayed, the routine returns to step S301 and this focus adjustment processing is repeated.

In the third embodiment, the camera 1 operates as explained above.

As explained above, in the third embodiment, when the focused position is could be detected by the contrast detection system, while the amount of defocus is periodically calculated, drive of the focus lens 32 based on the amount of defocus is prohibited until the focus lens 32 finishes being driven to the focused position which was detected by the contrast detection system. In this way, according to the third embodiment, even while driving the focus lens 32 to the focused position which was detected by the contrast detection system, the phase difference detection system can be used to calculate the amount of defocus, so in addition to the effect of the second embodiment, for example, the effects can be exhibited that when tracking a moving object, the direction of movement of a moving object can be predicted by using the amount of defocus which was calculated while driving the focus lens immediately after finishing driving the focus lens 32 to the focused position which was detected by the contrast detection system and the focus adjustment of the optical system can be more suitably performed.

Fourth Embodiment

Figure 16:
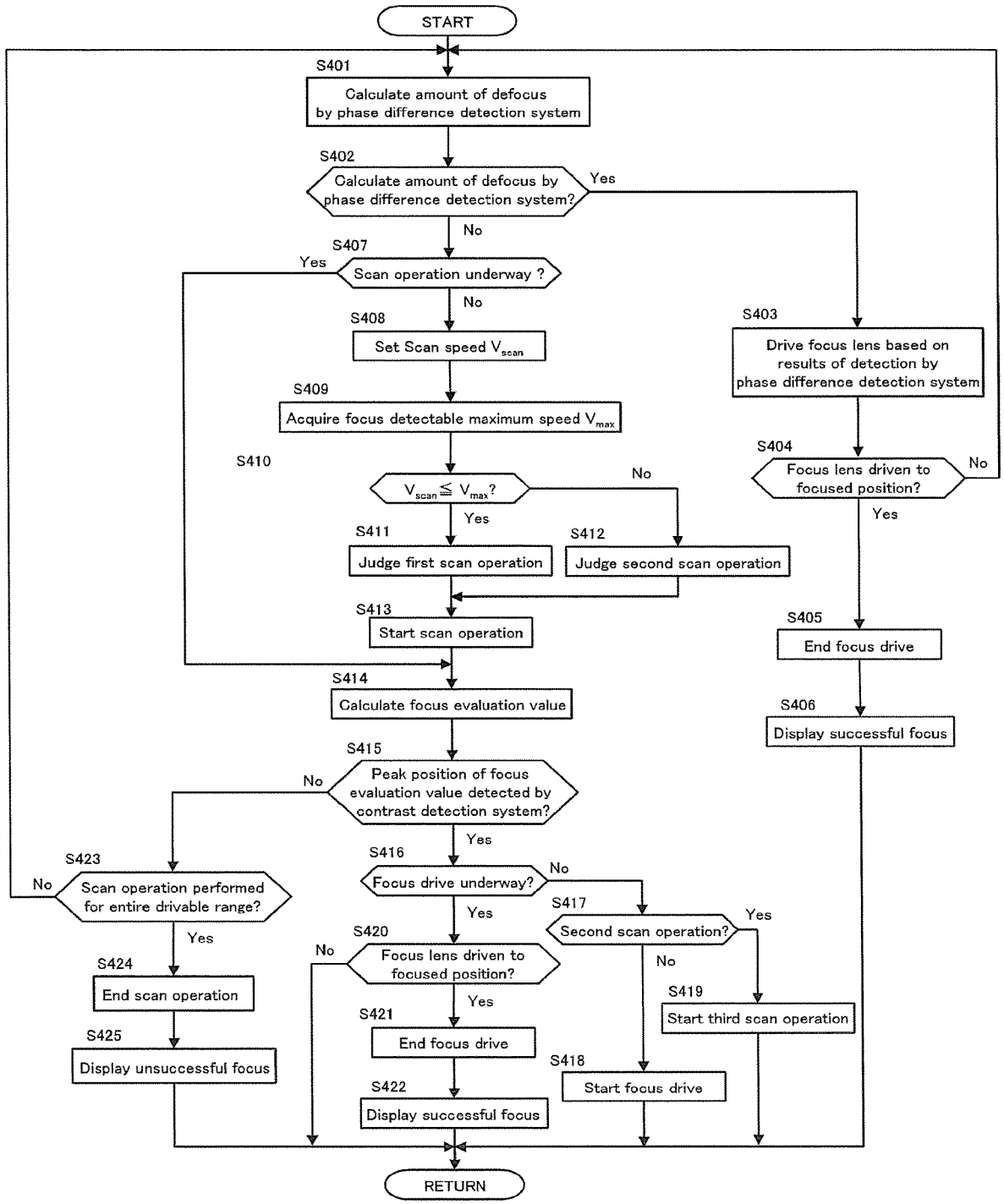
FIG. 16 is a flow chart which shows an example of operation of a camera according to a fourth embodiment.

Next, a fourth embodiment of the present invention will be explained based on the drawings. The fourth embodiment is similar to the first embodiment other than, as shown in FIG. 16, the operation of the camera 1 in the camera 1 which is shown in FIG. 1. Below, referring to FIG. 16, the operation of the camera 1 according to the fourth embodiment will be explained. Note that, FIG. 16 is a flow chart which shows the operation of the camera 1 according to the fourth embodiment. Note that, the following operation is started by the power of the camera 1 being turned on and the shutter release button which is provided at the operating unit 28 being half pressed (first switch SW1 on). Further, below, the explanation will be given with respect to the example of the continuous mode, that is, the mode of continuously detecting the focused state of the optical system and thereby capturing an image at a focus lens position corresponding to the object without fixing the position of the focus lens 32, being selected.

At step S401, in the same way as step S103 of the first embodiment, the camera control unit 21 is used to performs processing to calculate the amount of defocus by the phase difference detection system. Further, at step S402, in the same way as step S106 of the first embodiment, it is judged if the amount of defocus could be calculated by the phase difference detection system. If the amount of defocus could be calculated, it is judged that the distance can be measured and the routine proceeds to step S403. On the other hand, if the amount of defocus could not be calculated, it is judged that the distance cannot be measured and the routine proceeds to step S407. Note that, in the fourth embodiment as well, even when the amount of defocus can be calculated, if the reliability of the calculated amount of defocus is low, this is treated as if the amount of defocus could not be calculated and the routine proceeds to step S407.

At step S403 to S406, in the same way as steps S203 to S206 of the second embodiment, first, the focus lens 32 is driven based on the amount of defocus which was calculated by the phase difference detection system (step S403). While the focus lens 32 is being driven based on the amount of defocus to the focused position (step S404=No), the calculation of the amount of defocus by the phase difference detection system (step S401) and the drive of the focus lens 32 based on the amount of defocus (step S403) are repeated. Further, when the focus lens 32 is driven to the focused position (step S404=Yes), the focus drive operation of the focus lens 32 is ended (step S405) and successful focus is displayed (step S405). Further, after successful focus is displayed, the routine returns to step S401 where this focus adjustment processing is repeated.

On the other hand, when it is judged that the amount of defocus could not be calculated by the phase difference detection system or when it is judged that the reliability of the calculated amount of defocus is low (step S402=No), the routine proceeds to step S407.

At step S407, the camera control unit 21 is used to judge if a scan operation is being performed. When it is judged that a scan operation is not being performed, to start the scan operation, the routine proceeds to step S408, while when a scan operation is being performed, the routine proceeds to step S414.

At step S408, the camera control unit 21 is used to set the scan speed $V_{scan}$. Here, the scan speed $V_{scan}$ means the drive speed of the focus lens 32 in a scan operation. In the present embodiment, the camera control unit 21 sets the scan speed $V_{scan}$, as the speed suitable for focus detection by the phase difference detection system. Here, as the "speed suitable for focus detection by the phase difference detection system", for example the maximum speed in the speeds at which the phase difference detection system can detect the focus may be mentioned.

Further, in the present embodiment, the scan speed $V_{scan}$ is not a speed which is based on the actual drive speed of the focus lens 32, but is set as a speed based on the speed of movement of the image plane at the time of driving the focus lens 32 (image plane movement speed). Note that, the scan speed $V_{scan}$ may also be set while considering the brightness of the object or the maximum speed by which the focus lens 32 can be driven.

Next, at step S409, the camera control unit 21 is used to acquire the focus detectable maximum speed $V_{max}$. In the present embodiment, the focus detectable maximum speed $V_{max}$ is the maximum speed among the speeds at which the contrast detection system can detect the focused position. Here, as explained above, the focus detection operation by the contrast detection system drives the focus lens 32 for a scan while calculating the focus evaluation values at a predetermined sampling interval. The sampling interval of the focus evaluation values becomes larger the faster the drive speed of the focus lens 32. When the drive speed of the focus lens 32 exceeds a predetermined speed, the sampling interval of the focus evaluation values becomes too great and the focused position can no longer be suitably detected. The focus detectable maximum speed $V_{max}$ is the maximum speed at which the contrast detection system can detect the focused position, and the focus detectable maximum speed $V_{max}$ is also the speed which becomes the reference for judging if the scan speed $V_{scan}$ is the speed at which the contrast detection system can detect the focused position.

Further, in the present embodiment, the focus detectable maximum speed $V_{max}$ is stored in the memory 38 of the lens control unit 37. The camera control unit 21 can acquire from the lens control unit 37 the focus detectable maximum speed $V_{max}$ which is stored in the memory 38 of the lens control unit 37. Furthermore, in the present embodiment, the focus detectable maximum speed $V_{max}$, in the same way as the scan speed $V_{scan}$, is the speed based on the image plane movement speed. The camera control unit 21 obtains the focus detectable maximum speed $V_{max}$ based on the image plane movement speed from the lens control unit 37. Note that, if closing the aperture 34, the depth of focus becomes deeper, so sometimes the sampling interval of the focus evaluation values which enables detection of the focused position becomes larger. Therefore, when the focus detectable maximum speed $V_{max}$, corresponding to the aperture 34 is stored in the memory 38 of the lens control unit 37, the camera control unit 21 can obtain the focus detectable maximum speed $V_{max}$ corresponding to the aperture 34.

Note that, even when the memory 38 of the lens control unit 37 does not store the focus detectable maximum speed $V_{max}$ based on the image plane movement speed, if the focus detectable maximum speed $V_{max\text{-}lns}$ based on the actual drive speed of the focus lens 32 is stored, the camera control unit 21, as explained below, can obtain the focus detectable maximum speed $V_{max}$ based on the image plane movement speed. That is, the camera control unit 21, first, obtains from the lens control unit 37 the focus detectable maximum speed $V_{max\text{-}lns}$ based on the actual drive speed of the focus lens 32. Further, the camera control unit 21 can convert the focus detectable maximum speed $V_{max\text{-}lns}$ based on the active drive speed of the focus lens 32 acquired to the focus detectable maximum speed $V_{max}$ based on the image plane movement speed so as to obtain the focus detectable maximum speed $V_{max}$ based on the image plane movement speed. Specifically, the camera control unit 21 can acquire from the lens control unit 37 lens information including the focus detectable maximum speed $V_{max\text{-}lns}$ based on the actual drive speed of the focus lens 32 and the image plane movement coefficient (image plane movement speed accompanying drive of focus lens 32/actual drive speed of focus lens 32) and use the acquired lens information as the basis to convert the focus detectable maximum speed $V_{max\text{-}lns}$ based on the actual drive speed of the focus lens 32 to the focus detectable maximum speed $V_{max}$ based on the image plane movement speed so as to obtain the focus detectable maximum speed $V_{max}$ based on the image plane movement speed.

Further, at step S410, the camera control unit 21 compares the scan speed $V_{max}$ which was set at step S408 and the focus detectable maximum speed $V_{max}$ which was acquired at step S409 and judges if the scan speed $V_{scan}$ is a speed of the focus detectable maximum speed $V_{max}$ or less. When it is judged that the scan speed $V_{scan}$ is the speed of the focus detectable maximum speed $V_{max}$ or less (scan speed $V_{scan}$ ≤ focus detectable maximum speed $V_{max}$), the routine proceeds to step S411, while it is judged that the scan speed $V_{scan}$ is a speed faster than the focus detectable maximum speed $V_{max}$ (scan speed $V_{scan}$ > focus detectable maximum speed $V_{max}$), the routine proceeds to step S412.

At step S411, the camera control unit 21 judges if the scan operation which is started at the later explained step S413 is a first scan operation. Here, the "first scan operation" is a scan operation of driving the focus lens 32 by a scan speed $V_{scan}$ which is the same speed as the focus detectable maximum speed $V_{max}$ or less, that is, a scan speed $V_{scan}$ by which detection of the focused position by the contrast detection system is possible.

On the other hand, at step S412, the camera control unit 21 is used to judge that the scan operation which is started at the later explained step S413 is a second scan operation. Here, the "second scan operation" is a scan operation of driving the focus lens 32 by a scan speed $V_{scan}$ faster than the focus detectable maximum speed $V_{max}$.

At step S413, the camera control unit 21 is used to start the scan operation. Specifically, the camera control unit 21, first, to perform the scan operation by the scan speed $V_{scan}$ which was set at step S408, sends the scan speed $V_{scan}$ to the lens control unit 37. Further, the lens control unit 37 uses the scan speed $V_{scan}$ which was sent from the camera control unit 21 as the basis to generate a drive pulse signal for driving the focus lens 32 and sends the produced drive pulse signal to the focus lens drive motor 36 so as to drive the focus lens 32 by the scan speed $V_{scan}$. Further, it performs the scan operation by driving the focus lens 32 by the scan speed $V_{scan}$ while performing the calculation of the amount of defocus by the phase difference detection system and the calculation of the focus evaluation values by the contrast detection system simultaneously at a predetermined interval.

At step S414, the camera control unit 21 is used to perform processing to calculate the focus evaluation values by the contrast detection system. In the present embodiment, the processing for calculation of the focus evaluation values is performed by reading the pixel outputs from the imaging pixels 221 of the image pickup device 22, extracting the high frequency components of the read pixel outputs using a high frequency pass filter, and cumulatively adding the same. A focus evaluation value may be calculated by reading only the pixel outputs of the imaging pixels 221 corresponding to a selected focus detection position when a specific focus detection position is selected by manual operation of the user or by an object recognition mode etc.

Further, at step S415, the camera control unit 21 is used to judge if the peak of the focus evaluation values could be detected by the contrast detection system as the results of the scan operation. If the peak of the focus evaluation values could be detected by the contrast detection system, the routine proceeds to step S416, while if the peak of the focus evaluation values could be detected by the contrast detection system, the routine proceeds to step S423.

When it is judged at step S415 that the peak of the focus evaluation values could be detected by the contrast detection system, the routine proceeds to step S423 where the camera control unit 21 is used to judge if the scan operation was performed over the entire drivable range of the focus lens 32. When the scan operation was not performed over the entire drivable range of the focus lens 32, the routine returns to step S401. After returning to step S401, the phase difference detection system is again used to calculate the amount of defocus (step S401). If the amount of defocus could not be calculated (step S402=No), the routine proceeds to step S407. At step S407, it is judged that the scan operation is being performed (step S407=Yes), then the routine proceeds to step S414 where the focus evaluation values are again calculated (step S414). Further, when the contrast detection system cannot be used to detect a peak of the focus evaluation values (step S415=No), again, at step S423, it is judged if a scan operation has been performed over the entire drivable range of the focus lens 32.

In this way, after the scan operation is started, if the amount of defocus could be calculated by the phase difference detection system (step S402=Yes), if the peak of the focus evaluation values could be detected (step S415=Yes), or until the scan operation is performed over the entire drivable range of the focus lens 32 (step S423=Yes), a scan operation is continued where the focus lens 32 is driven for a scan operation while calculation of the amount of defocus by the phase difference detection system (step S401) and calculation of the focus evaluation values by the contrast detection system (step S414) are repeated. Further, when the amount of defocus could be calculated by the phase difference detection system as the results of a scan operation (step S402=Yes), the routine proceeds to step S403 where the focus operation is performed (step S403 to S406). On the other hand, when the peak of the focus evaluation values could be detected by the contrast detection system as the results of a scan operation (step S415=Yes), the routine proceeds to step S416.

At step S416, the camera control unit 21 is used to judge if a focus driven operation is being performed to drive the focus lens 32 to the focused position which was detected by the contrast detection system. When a focus drive operation is performed by the results of detection by the contrast detection system, the routine proceeds to step S420, while a focus drive operation is not performed by the results of detection by the contrast detection system, the routine proceeds to step S417.

At step S417, the camera control unit 21 is used to judge if the scan operation which is underway is the second scan operation. When the scan operation which is underway is not the second scan operation, the routine proceeds to step S418 for a focus drive operation. On the other hand, when it is judged that the scan operation which is underway is the second scan operation, the routine proceeds to step S419.

When, at step S417, it is judged that the scan operation which is underway is not the second scan operation, the routine proceeds to step S418. At step S418, a focus drive operation is started which drives the focus lens 32 to the focused position. For example, when the scan operation which is underway is the first scan operation (step S417=No), a focus drive operation is started toward the focused position which was detected by the first scan operation. Here, in the first scan operation, the scan speed $V_{scan}$ is the speed by which detection of the focused position by the contrast detection system is possible, so the peak of the focus evaluation values which was detected by the contrast detection system can be judged to be the focused position. Therefore, when as a result of the scan operation, a peak of the focus evaluation values is detected (step S415=Yes) and the scan operation which is underway is not the second scan operation (step S417=No), at step S418, a focus drive operation is started for driving the focus lens 32 to the peak of the focus evaluation values (focused position) which was detected by the scan operation. Note that, the drive speed of the focus lens 32 at the focus drive operation can be made the maximum speed among the speeds by which the focus lens 32 can be driven.

Further, after the focus drive operation is started at step S418, the routine returns to step S401 and the calculation of the amount of defocus by the phase difference detection system (step S401) and the calculation of the focus evaluation values (step S414) are performed, then the routine again proceeds to step S416 where it is judged if the focus drive operation is being performed. After the focus drive operation is started at step S418, at step S416, it is judged that the focus drive operation is being performed (step S416=Yes), then the routine proceeds to step S420.

At step S420, the camera control unit 21 is used to judge if the focus lens 32 has been driven up to the focused position. If a focus drive operation is started toward the focused position which was detected by the scan operation (step S418), then it is judged that the focus lens 32 has not been driven to the focused position until the focus lens 32 finishes being driven to the focused posit ion (step S420=No), then the routine returns to step S401. Further, until the focus lens 32 finishes being driven to the focused position (step S420=No), calculation of the amount of defocus by the phase difference detection system (step S401) and calculation of the focus evaluation values by the contrast detection system (step S414) are repeated while a focus drive operation is continued toward the focused position. On the other hand, if the focus lens 32 finishes being driven to the focused position (step S420=Yes), the routine proceeds to step S421. Note that, at step S420, not only the case of driving the focus lens 32 to the focused position, but also the case of driving the focus lens 32 to within the depth of focus corresponding to the focused position is treated as the focus lens 32 having been driven to the focused position, then the routine proceeds to step S421.

At step S421, the camera control unit 21 is used to perform processing for ending the focus drive operation of the focus lens 32 since the drive operation of the focus lens 32 to the focused position is ended. Next, the routine proceeds to step S422 where successful focus is displayed. After successful focus is displayed, the routine returns to step S401 and this focus adjustment processing is repeated.

Note that, successful focus is displayed at step S442 by, for example, the electronic viewfinder 26. Further, when displaying successful focus, it is also possible display the fact of the contrast detection system performing the focus operation to inform this to the user.

In this way, in the present embodiment, when it is judged that the scan speed $V_{scan}$ is a speed of the focus detectable maximum speed $V_{max}$ or less (scan speed $V_{scan} \le$ focus detectable maximum speed $V_{max}$) (step S410=Yes) and it is judged that the scan operation is the first scan operation (step S411), if the peak of the focus evaluation values is detected (step S415=Yes), it is judged that the peak position of the focus evaluation values which was detected by the first scan operation is the focused position and a focus drive operation is performed which drives the focus lens 32 to the peak position (focused position) of the focus evaluation values (step S418).

Figure 17:
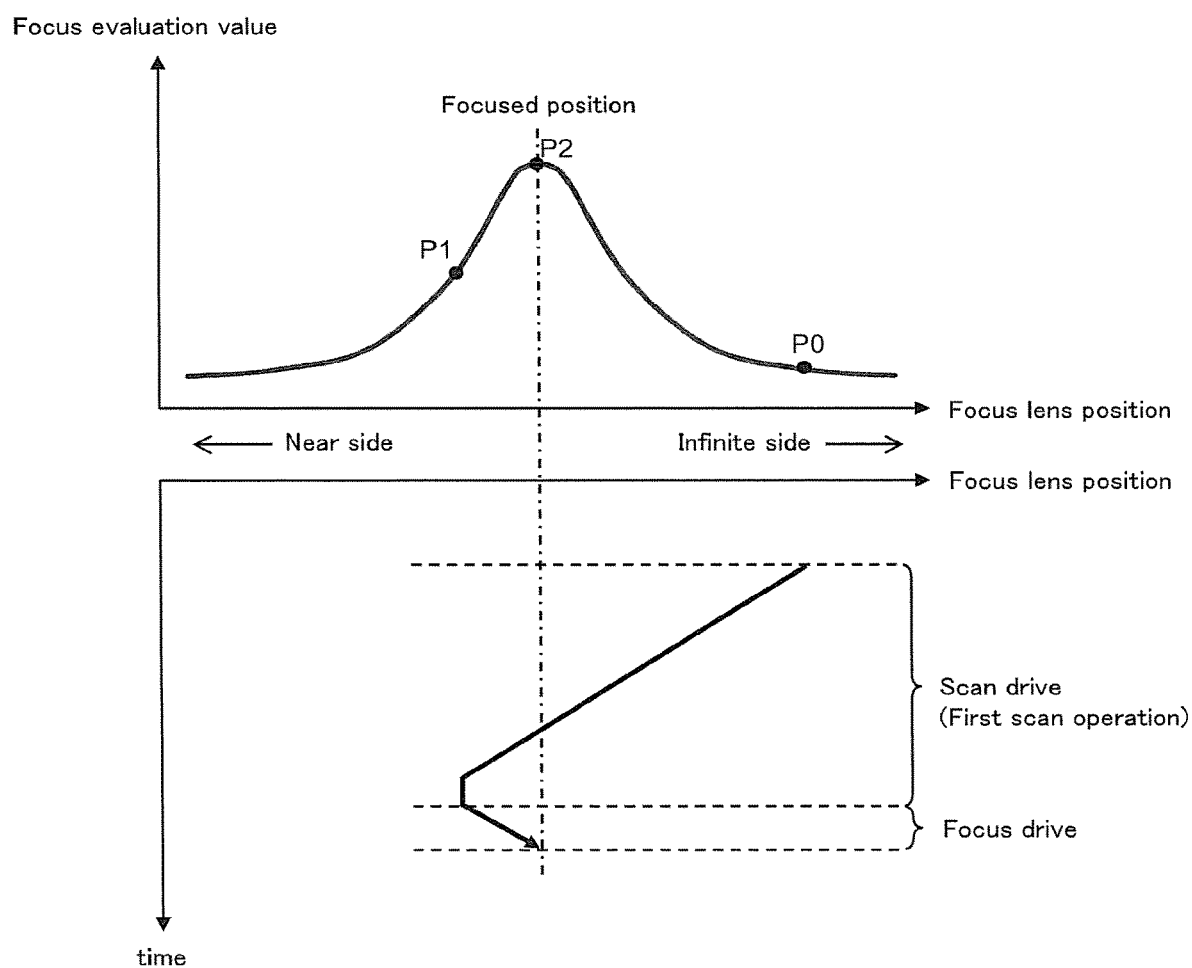
FIG. 17 is a view which shows a relationship between a focus lens position and focus evaluation values and a relationship between a focus lens position and time in a first scan operation.

Here, referring to FIG. 17, the operation of the camera 1 in the case where the above first scan operation is performed will be explained. FIG. 17 is a view which shows the relationship between the focus lens position and focus evaluation values and the relationship between the focus lens position and time in the first scan operation. As shown in FIG. 17, when the scan operation is started, the focus lens 32 is positioned at P0 which is shown in FIG. 17. From P0 the focus lens 32 is driven from the infinite side to the near side while acquiring the focus evaluation values. Further, if the peak position of the focus evaluation values is detected at the point of time when making the focus lens 32 move to the position of P1 which is shown in FIG. 17 (step S415=Yes), it is judged if the scan operation is the second scan operation (step S417). Here, in the example which is shown in FIG. 17, the first scan operation is being used to perform a scan operation, so the peak position of the focus evaluation values which was detected at the first scan operation is judged as the focused position (step S417=No), and a focus drive operation for driving the focus lens 32 to the focused position (in FIG. 17, position of P2) (step S418) is started.

On the other hand, when it is judged at step S417 that the second scan operation is being performed (step S417=Yes), the routine proceeds to step S419. At step S419, the camera control unit 21 is used to start a third scan operation. Here, the "third scan operation" is performed after the second scan operation and is performed near the peak position of the focus evaluation values which was detected by the second scan operation. Further, the third scan operation, in the same way as the above first scan operation, drives the focus lens 32 by a scan speed $V_{scan}$, by which the contrast detection system can detect the focused position. At step S419, the camera control unit 21 changes the scan speed $V_{scan}$ from the speed in the second scan operation (scan speed $V_{scan}>$focus detectable maximum speed $V_{max}$) to the speed at which the contrast detection system can detect the focused position (scan speed $V_{scan} \le$ focus detectable maximum speed $V_{max}$) and starts the third scan operation at the scan speed $V_{scan}$ at which the contrast detection system can detect the focused position.

After the third scan operation is started at step S419, the routine returns to step S401. Further, in the third scan operation as well, if the amount of defocus could be calculated by the phase difference detection system (step S402=Yes), the peak of the focus evaluation values was detected (step S415=Yes), or until the third scan operation is performed over the entire drivable range of the focus lens 32 (step S423=Yes), the third scan operation is performed which drives the focus lens 32 by a scan speed $V_{scan}$ at by which the detection of the focused position by the contrast detection system is possible while repeating calculation of the amount of defocus by the phase difference detection system (step S401) and detection of the focused position by the contrast detection system (step S414). Further, when the third scan operation detects the peak of the focus evaluation values (step S415=Yes), the camera control unit 21 judges the peak of the focus evaluation values which was detected by the third scan operation as the focused position, then the routine proceeds to step S416.

Right after a peak of the focus evaluation values is detected by the thirds can operation, a focus drive operation has not been started (step S416=No), so the routine proceeds to step 417. Further, at step S417, the third scan operation is being performed, so it is judged that the scan operation being performed is not the second scan operation (step S417=No) and a focus drive operation is started toward the peak position of the focus evaluation values (focused position) which was detected at the third scan operation (step S418).

After the focus drive operation is started toward the peak position of the focus evaluation peak which was detected at the third scan operation, the routine returns to step S401 and the phase difference detection system is used to calculate the amount of defocus (step S401) and the focus evaluation value is calculated (step S414), then again the routine proceeds to step S416 where it is judged if a focus drive operation is being performed. After the focus drive operation is started, it is judged that a focus drive operation is being performed (step S416=Yes), then it is judged if the focus lens 32 has been driven to the focused position (step S420). Until finished being driven to the focused position which was detected at the third scan operation, it is judged that the focus lens 32 has not been driven to the focused position (step S420=No), then the routine returns to step S401 and the calculation of the amount of defocus by the phase difference detection system (step S401) and the calculation of the focus evaluation values by the contrast detection system (step S420) are repeated while continuing the focus drive operation to the focused position which was detected by the third scan operation. Further, when the focus lens 32 finishes being driven to the focused position (step S420=Yes), the focus drive operation of the focus lens 32 is ended (step S421) and successful focus is displayed (step S422).

In this way, in the present embodiment, when it is judged if the scan speed $V_{scan}$ is a speed faster than the focus detectable maximum speed $V_{max}$ (scan speed $V_{scan}>$focus detectable maximum speed $V_{max}$) (step S410=No) and it is judged that the scan operation is the second scan operation (step S412), if the peak of the focus evaluation values is detected (step S415=Yes), the scan speed $V_{scan}$ is changed to a speed of the focus detectable maximum speed $V_{max}$ or less, that is, the speed at which detection of the focused position by the contrast detection system is possible and the third scan operation is started (step S419). Further, when this third scan operation detects the peak of the focus evaluation values (step S415=Yes), the peak position of the focus evaluation values which was detected by the third scan operation is judged to be the focused position and a focus drive operation is performed for driving the focus lens 32 to the peak position of the focus evaluation values (focused position).

Figure 18:
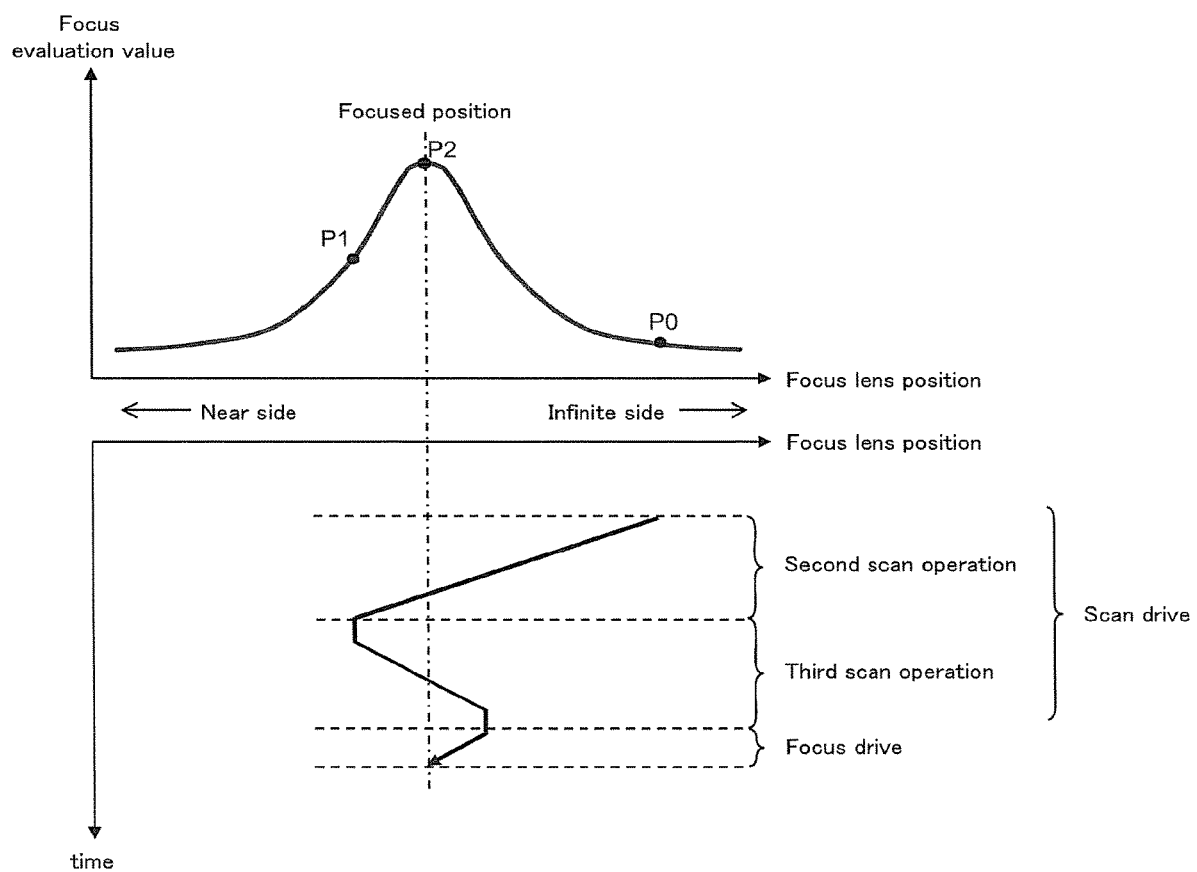
FIG. 18 is a view which shows a relationship between a focus lens position and focus evaluation values and a relationship between a focus lens position and time in a second scan operation and third scan operation.

Here, referring to FIG. 18, the operation of the camera 1 in the case where the second scan operation and this following third scan operation are performed will be explained. FIG. 18 is a view which shows the relationship between the focus lens position and the focus evaluation values and the relationship between the focus lens position and time in the second scan operation and third scan operation. As shown in FIG. 18, at the time of start of the scan operation, the focus lens 32 is positioned at P0 which is shown in FIG. 18. From P0, the focus lens 32 is driven from the infinite side toward the near side while obtaining the focus evaluation values. Further, if the peak position of the focus evaluation values is detected at the time when making the focus lens 32 move to the position of P1 which is shown in FIG. 18 (step S415=Yes), it is judged that the scan operation is the second scan operation (step S417). Here, in the example which is shown in FIG. 18, the second scan operation is performed (step S417=Yes), so as shown in FIG. 18, after the second scan operation, a scan operation is started by the third scan operation (step S419). Further, as shown in FIG. 18, when the third scan operation is performed and the peak of the focus evaluation values is detected by the third scan operation (step S415=Yes), the peak position of the focus evaluation values which was detected by the scan operation by the third scan operation is judged as the focused position and a focus drive operation up to the focused position which was detected by the third scan operation (in FIG. 18, position of P2) is started (step S418).

Note that, when the scan operation is performed over the entire drivable range of the focus lens 32, at step S423, it is judged that the scan operation was finished over the entire drivable range of the focus lens 32 and the routine proceeds to step S424. At step S424, the results of the scan operation show the focus could not be detected by either system of the phase difference detection system and contrast detection system, so processing is performed to end the scan operation, then the routine proceeds to step S425 where unsuccessful focus is displayed. Further, after unsuccessful focus is displayed, the routine returns to step S401 and this focus adjustment processing is repeated. Note that, unsuccessful focus is displayed at step S425 by, for example, the electronic viewfinder 26.

In the above way, according to the fourth embodiment, when the results of the comparison of the scan speed $V_{scan}$ and the focus detectable maximum speed $V_{max}$ show that the scan speed $V_{scan}$ is same speed as the focus detectable maximum speed $V_{max}$ or less (scan speed $V_{scan} \leq$ focus detectable maximum speed $V_{max}$) (that is, when the scan operation is the first scan operation), the peak of the focus evaluation values is judged as the focused position and a focus drive operation is performed. In this way, in the present embodiment, when the scan speed $V_{scan}$ is a speed at which the contrast detection system can detect the focused position, the peak of the focus evaluation values which was detected by the contrast detection system is judged as is as the focused position and then a focus drive operation is performed, so it is possible to shorten the time which is taken for focus adjustment.

Furthermore, according to the fourth embodiment, when the results of the comparison of the scan speed $V_{scan}$ and the focus detectable maximum speed $V_{max}$ show the scan speed $V_{scan}$ is faster than the focus detectable maximum speed $V_{max}$ (scan speed $V_{scan}>$focus detectable maximum speed $V_{max}$) (that is, when the scan operation is the second scan operation), after detection of the peak of the focus evaluation values by the second scan operation, a third scan operation is performed which performs a scan operation by a scan speed $V_{scan}$ by which detection of the focused position by the contrast detection system is possible. Further, when the third scan operation detect the peak of the focus evaluation values, it is judged that the peak position of the focus evaluation values which was detected by the third scan operation is the focused position and a focus drive operation is performed. In this way, in the present embodiment, a second scan operation is performed so as to detect the peak of the focus evaluation values by a fast scan speed $V_{scan}$, then a third san operation is performed which performs a scan operation by a scan speed $V_{scan}$ at which the detection of the focused position by the contrast detection system is possible, so it is possible to shorten the time which is taken for focus adjustment while suitably detecting the focused position.

Note that, the above explained embodiments were described to facilitate understanding of the present invention and were not described to limit the present invention. Therefore, the elements which are disclosed in the above embodiments include all design changes and equivalents falling under the technical scope of the present invention.

For example, in the first embodiment, processing for calculation of the amount of defocus by the phase difference detection system and processing for calculation of the focus evaluation values are started before the shutter release button which is provided at the operating unit 28 was half pressed (steps S103 to S105 shown in FIG. 12), but the invention is not limited to such a configuration. For example, it is also possible that the processing for calculation of the amount of defocus by the phase difference detection system and processing for calculation of the focus evaluation values are started after the shutter release button is half pressed.

Further, from the second embodiment to the fourth embodiment, after the focus drive operation finished and successful focus was displayed, the amount of defocus was immediately calculated by the phase difference detection system and, when the amount of defocus could not be calculated, the scan operation was again repeated, but the invention is not limited to such a configuration. For example, it is also possible to judge if a certain time (for example, 1 second) has elapsed from when successful focus was displayed and, when the certain time has elapsed from when successful focus was displayed, to calculate the amount of defocus by the phase difference detection system or perform a scan operation.

Furthermore, in the embodiment, it is also possible to calculate the focus evaluation values by the contrast detection system even while the focus lens 32 is being driven based on the amount of defocus by the phase difference detection system. By calculating the focus evaluation values by the contrast detection system even while driving the focus lens 32 based on the amount of defocus, it is possible to suitably detect the focus by the contrast detection system after finishing driving the focus lens 32 based on the amount of defocus.

Further, in the embodiment, when the contrast detection system detects the focused position, the focus lens 32 is directly driven to the focused position, but the invention is not limited to this constitution. For example to stop hunting, it is also possible to once drive the focus lens 32 up to a position beyond the focused position, then return the focus lens 32 to the focused position.

Furthermore, in the embodiment, the image pickup device 22 is provided with the focus detection pixels 222a, 222b to detect the focus by the phase difference detection system simultaneously with detecting the focus by the contrast detection system, but the invention is not limited to this. For example, it is also possible to use a semi transparent type pellicle mirror to branch light beams from the optical system and guide part of the light beams to a not shown phase difference detection module so as to detect the focus by the phase difference focus detection system simultaneously with focus detection by the contrast detection system.

In addition, in the embodiments, a camera 1 which can simultaneously perform, as the scan operation, detection of the focused state by the phase difference detection system and detection of the focused state by the contrast detection system was explained as an example, but the invention is not limited to this. For example, instead of the detection of the focused state by the phase difference detection system, it is also possible to detect the focused state by the active AF system or the external light passive AF system.

Further, in the fourth embodiment, the scan speed $V_{scan}$ which was set at step S408 and the focus detectable maximum speed $V_{max}$ were compared to judge if the scan operation which was started was the first scan operation or the second scan operation, but for example it is also possible to start the scan operation (step S413), then measure the scan speed at the scan operation and compare the measured scan speed and the focus detectable maximum speed $V_{max}$ so as to judge if the scan operation is the first scan operation or the second scan operation.

Further, in the fourth embodiment, in the scan operation, even when the peak of the focus evaluation values (focused position) are detected by the contrast detection system, the amount of defocus is calculated by the phase difference detection system and, when the amount of defocus could be calculated, a focus drive operation is performed toward the focused position which was detected by the phase difference detection system, but the invention is not particularly limited to this. For example, when the peak of the focus evaluation values (focused position) are detected by the contrast detection system, it is also possible to prohibit calculation of the amount of defocus by the phase difference detection system or a focus drive operation to the focused position which was detected by the phase difference detection system.

Note that, the camera 1 of the embodiment is not particularly limited. The present invention may for example be applied to a digital video camera, a single lens reflex digital camera, a built-in lens type digital camera, a camera of a mobile phone, or another optical device.

What is claimed is:

1. An imaging apparatus comprising:
a sensor which outputs a signal for capturing an image of an object formed by an optical system with a focus adjustment lens; and
a control unit which calculates, based on the signal, a focus evaluation value indicating a focus state of the image while moving the focus adjustment lens, wherein the control unit:
performs a first scan control for calculating the focus evaluation value a plurality of times while moving the focus adjustment lens at a speed equal to or lower than a first speed,
performs a second scan control for calculating the focus evaluation value a plurality of times while moving the focus adjustment lens at a speed higher than the first speed,
when detecting a second peak of the focus evaluation value under the second scan control, starts the first scan control in a range including a position which corresponds to the second peak of the focus evaluation value, and
when detecting a first peak of the focus evaluation value under the first scan control, moves the focus adjustment lens to a position which corresponds to the first peak of the focus evaluation without performing the second scan control after performing the first scan control.

2. The imaging apparatus as set forth in claim 1, further comprising an electrical signal contact for receiving information about the first speed from a lens barrel having the optical system.

3. The imaging apparatus as set forth in claim 1, wherein the first speed is a highest speed at which a focusing position, at which the image of the object is in focus on the sensor, can be detected based on the focus evaluation value.

4. The imaging apparatus as set forth in claim 1, wherein the first speed is determined on a basis of a moving speed of the image at which a focus position of the focus adjustment lens can be detected on a basis of the focus evaluation value.

5. The imaging apparatus as set forth in claim 1, wherein the first speed changes depending on an aperture value of the optical system.

6. The imaging apparatus as set forth in claim 1, wherein the control unit:
detects an amount of deviation between a position of the image of the object and an image plane of the sensor based on the signal while moving the focus adjustment lens, and
moves the focus adjustment lens based on the deviation when the deviation is detected while performing either the first scan control or the second scan control.

7. An imaging apparatus comprising:
a sensor which outputs a signal for capturing an image of an object formed by an optical system with a focus adjustment lens; and
a control unit that performs a scan control which calculates, based on the signal, a focus evaluation value indicating a focus state of the image a plurality of times while moving the focus adjustment lens, wherein the control unit:
when a speed of the focus adjustment lens under the scan control is higher than a first speed, (i) performs another scan control which moves the focus adjustment lens at a speed equal to or lower than the first speed in a range including a position corresponding to a peak of evaluation value under the scan control and (ii) moves the focus adjustment lens to a position corresponding to a peak of the focus evaluation value detected under the other scan control, and
when the speed of the focus adjustment lens under the scan control is equal to or lower than the first speed, does not perform the other scan control and moves the focus adjustment lens to the position corresponding to the peak of the focus evaluation value detected under the scan control.

8. A camera comprising:
the imaging apparatus as set forth in claim 1; and
a lens barrel with the optical system.

9. A camera comprising:
the imaging apparatus as set forth in claim 7; and
a lens barrel with the optical system.

* * * * *